United States Patent [19]
Bulow

[11] Patent Number: 5,583,636
[45] Date of Patent: Dec. 10, 1996

[54] INTERFEROMETRIC MODULATOR FOR OPTICAL SIGNAL PROCESSING

[76] Inventor: Jeffrey A. Bulow, 209 Granger Rd., W., Syracuse, N.Y. 13219

[21] Appl. No.: 237,186

[22] Filed: May 3, 1994

Related U.S. Application Data

[63] Continuation-in-part of Ser. No. 780,786, Oct. 23, 1991, Pat. No. 5,315,370.
[51] Int. Cl.[6] ................................ G01B 9/02
[52] U.S. Cl. ................................ 356/345
[58] Field of Search ........................ 356/345, 358; 359/181, 188; 385/2, 12, 14

[56] References Cited

U.S. PATENT DOCUMENTS

| | | | |
|---|---|---|---|
| 3,738,754 | 6/1973 | Marcy et al. | 356/358 |
| 4,533,247 | 8/1985 | Epworth | 356/358 |
| 5,117,471 | 5/1992 | Fürstenau | 356/345 |
| 5,315,370 | 5/1994 | Bulow | 356/345 |

*Primary Examiner*—Samuel A. Turner
*Attorney, Agent, or Firm*—Lalos & Keegan

[57] ABSTRACT

An interferometric modulator uses a beamsplitter to produce deflected and transmitted light beams onto mirrored surfaces of a piezoelectric crystal pair, one piezoelectric crystal being driven by a modulating voltage signal, whereupon the light beams are reflected back to the beamsplitter to produce a modulated optical output signal, with the modulator being especially adaptable for use as a digital photonic clock, as a pulse width/amplitude modulator, and as a bistable optical memory cell. A self-switching optical digital clock generates a digital signal without piezoelectric crystals by using analog optical feedback signals of precise time durations. Interferometric modulation is also used to amplify a sinusoidal electromagnetic signal, to regulate signal amplification, and to create logic functions.

45 Claims, 10 Drawing Sheets

θ IS PHASE OF ENVELOPE
φ IS PHASE OF CARRIER (a)

(b)

INTERFEROMETRIC MODULATOR FOR OPTICAL SIGNAL PROCESSING

This application is a continuation-in-part of pending U.S. application Ser. No. 07/780,786 filed Oct. 23, 1991, now U.S. Pat. No. 5,315,370.

FIELD OF THE INVENTION

The present invention relates generally to computer optical processing circuits using interferometric techniques, and more specifically, to an interferometric modulator for optical signal processing. The invention further contemplates an interferometric modulator that is particularly suitable for use as a digital photonic clock, as a pulse width/amplitude modulator, and as a bi-stable optical memory cell, as an optical amplifier, amplitude regulator, and logic circuit.

BACKGROUND OF THE INVENTION

Efforts are constantly being made to improve the efficiency of processing time in state of the art computers. In the area of optical computing, semiconductor circuitry is operated at optimized semiconductor rates, and electronic signals are changed to optical signals by the computer's semiconductor micro-circuitry in an effort to speed up the computer processing time. Still, the computer processing rate could be made faster if electronic signals are independently converted into optical signals using a dedicated electro-mechanical process prior to receipt and/or use of the electronic signal by the computer. A high speed optical signal is provided as an input to the computer's central processing unit (CPU). The high speed optical signal is used to govern the processing rate within the computer's CPU.

Optics have also been used in measurement circuits. A corrective circuit, as was applied with some notoriety in connection with the Hubbell telescope, used interference optics as a means for fine measurement of a curved surface. Optical interferometry has also been used to determine subtle changes in the optical refractive index of optically transmissive gases as a measure of pressure or concentration.

While optics have been heretofore used primarily in areas of audio signal processing, image processing and also in detection and measurement circuitry, there has been little application in the use of optical processing for signal generation and signal processing beyond the transformation of an electronic signal in a computer's internal signal processing circuitry.

SUMMARY OF THE INVENTION

In view of the foregoing, the present invention has been developed to provide circuitry and apparatus for utilizing electronic signals to create specialized optical signals by use of an interferometric modulator. An interferometric modulator uses controlled, dynamic interferometry and an optical source to create and process optical signals. It is a principal object of the present invention to provide an interferometric modulator for electromagnetic (e.g. optical) signals, which would have applications in computers and other processing networks.

A further object of the present invention is to provide an interferometric optical modulator which can be utilized as a digital photonic clock circuit, a pulse width/amplitude modulator circuit, and a bi-stable optical-memory cell circuit.

In accomplishing these and other objectives, an interferometric modulator for optical carrier signals is provided comprising a piezoelectric crystal having a mirrored surface, either polished, applied, or attached, a controlled driving voltage applied to the piezoelectric crystal, and a light beam deflected by a beamsplitter whereby at least a portion of the light beam is reflected from and a portion is transmitted by the beamsplitter interface and recombined at the same interface to produce an output optical signal which is interference modulated as a function of the controlled driving voltage.

It is yet a further object of the present invention to provide a self-switching optical digital clock that generates a digital signal using analog optical feedback signals of precise time durations.

Further objects of the present invention are an optical amplifier circuit, amplitude regulator and logic circuits.

BRIEF DESCRIPTION OF THE DRAWINGS

These and other objects and features of the present invention will become apparent from the following description with reference to the accompanying drawings, in which.

DETAILED DESCRIPTION OF THE PREFERRED EMBODIMENTS

Figure 1:
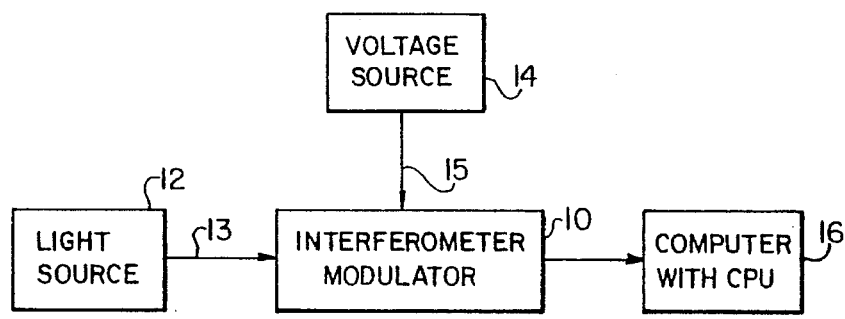
FIG. 1 is a block diagram of a set of interferometric modulators according to the invention arranged as a digital photonic clock showing outside light and voltage sources applied to each interferometric modulator of the clock for producing an optical signal as an input to a computer's CPU.

Referring to FIG. 1, a set of interferometric modulators 10 arranged as a digital photonic clock is shown connected to a source 12 (e.g. light source) that provides an electromagnetic carrier signal on line 13, and to a voltage source 14 that provides an electrical modulator signal on line 15. It should be noted that the electromagnetic carrier signal is not limited to the optical range but may be in the ultraviolet, infrared or any range of oscillating electromagnetic radiation that is suited to a specific application. Light source 12 produces a monochromatic beam of light, such as from a laser at frequency $f_L$. The output from the interferometric modulator is delivered to a computer 16, and more particularly, to an input-output controller or to the CPU of the computer.

Figure 2:
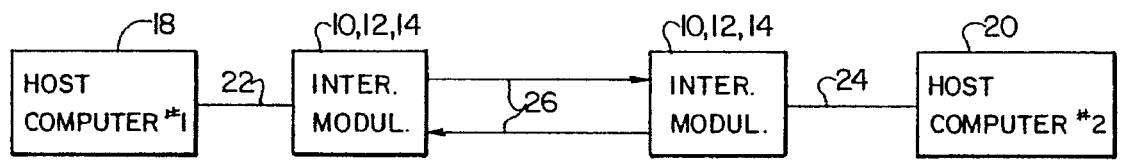
FIG. 2 is a block diagram depicting two sets of interferometric optical modulators of the invention each set arranged as a digital photonic-clock. Each clock is used as an input/output interface handler (controller) between host computers.

FIG. 2 is a block diagram of a set of interferometric modulators, arranged as digital photonic clocks, each clock including a light source 12 and a voltage source 14, utilized as an interface to a computer in a system where two host computers 18, 20 are communicating with one another. The connections 22, 24 between each digital photonic clock and its respective host computer 18, 20 generally cover a short distance since the clock would in most instances be attached directly to the structure, such as to an optical terminal, of the computer's input/output controlling processor. Alternately, the digital photonic clock may be internal to the computer but would be independent from the semiconductor processing circuitry of the computer. The interconnecting lengths between the host computers would typically be of greater relative distances with the connections 26 utilizing fiber optics in the preferred embodiment. It will be appreciated, however, that various types of known transmission mediums could be used in such a system, such as direct wire, waveguide or microwave links.

One application particularly suitable for the system of FIG. 2 is a mobile car telephone used in connection with a satellite communication system where the satellite serves as a repeater in providing service to rural areas. Major problems to be overcome in such an application is background noise, band width and the volume of traffic on the system links, all of which are a function of the data rate and carrier frequency. Data accuracy and the number of available channels are also problems that must be overcome in this application. The use of an optically modulated signal using interferometric techniques, according to the invention, is particularly suitable in such a system, as represented by the block diagram of FIG. 2, where the host computers are used as communications network controllers.

Figure 3:
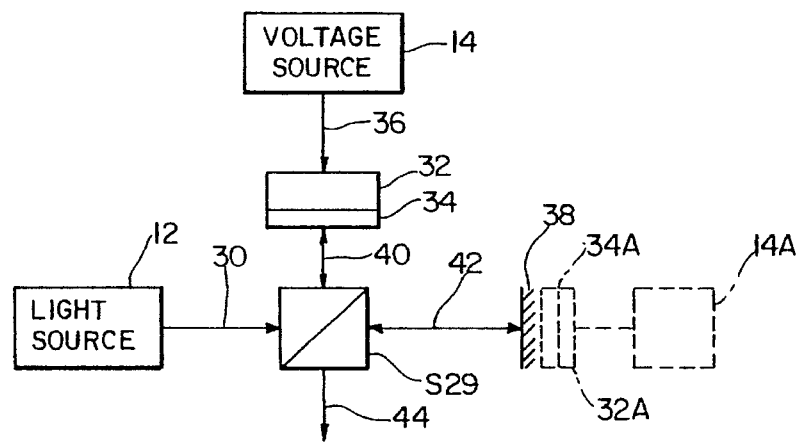
FIG. 3 is an illustration of the apparatus of a single interferometric modulator according to the invention.

Turning now to the structural details of a single interferometric optical modulator, FIG. 3 shows a beamsplitter S29 which receives a light beam 30 from light source 12. Light beam 30 (i.e. optical signal) will have a fundamental frequency as controlled by source 12. A piezoelectric crystal 32 with a mirrored surface 34 is positioned a distance from and facing one side of beamsplitter S29, shown above the beamsplitter in the drawing of FIG. 3. A voltage source 14 provides a signal having a given amplitude and frequency, which is applied (on line 36) to piezoelectric crystal 32 as the modulating signal. A fixed mirrored surface 38 is positioned a distance from and faces another side of beamsplitter S29, shown to the right of the beamsplitter in the drawing of FIG. 3. Alternately, fixed mirrored surface 38 could be replaced with a piezoelectric crystal 32A with a mirrored surface 34A, connected to a voltage source 14A for producing a signal having a predetermined phase relationship to the signal produced by voltage source 14.

Light beam 30 impinges on beamsplitter S29, whereupon a portion (approximately half in the preferred embodiments) 40 of light beam 30 is reflected by the beamsplitter and impinges on the mirrored surface 34 of the piezoelectric crystal and is reflected back to the beamsplitter. A transmitted portion (approximately half in the preferred embodiments) 42 of light beam 30 is transmitted by the beamsplitter and impinges on mirrored surface 38 and is likewise reflected back to the beamsplitter. The reflected signal portion 40 and transmitted signal portion 42 will have a respective phase relationship. The optical path length of signal 40 will be determined by the distance of between beamsplitter S29 and mirrored surface 34. Similarly, the optical path length of signal 42 will be determined by the distance between beamsplitter S29 and mirrored surface 38 (or 34A). The two signals 40 and 42 return and recombine in beamsplitter S29 and emerge as output signal 44. The reflected light beam 40 is modulated, e.g. along the optical path length axis of mirrored surface 34, by the motion of mirrored surface 34 and by its impingement on the mirrored surface 34. Mirrored surface 34 is being driven by a signal provided by voltage source 14. The modulation of the reflected light beam 40 from mirrored surface 34 is a function of the amplitude and frequency of the signal generated by voltage source 14. This modulated optical signal recombined with unmodulated, but reflected, light beam 42 appears at the output of the beamsplitter and as the output of the interferometric modulator. As the piezoelectric crystal 32 responds to the modulating electrical signal (on line 36) from voltage source 14 the distance between mirrored surface 34 and beamsplitter S29 varies, as does the optical path length of reflected signal portion 40 and the respective phase relationship between signal portions 40 and 42. When these signals recombine at beamsplitter S29, they result in a modulated output signal 44 having a fundamental frequency determined by the varying phase relationship between the signal portions 40 and 42. In an alternate embodiment, utilizing piezoelectric crystal 32A with mirrored surface 34A and voltage source 14A, it is the optical path length of transmitted signal portion 42 that is varied. Modulating or varying the transmitted signal portion provides an equivalent function to modulating or varying the reflected signal portion in the present invention. Choosing to modulate or vary the reflected or transmitted signal portion, or both, is a matter of design choice in a given application.

It is understood that conventional voltage source 14 could produce any wave shape, such as a sine wave, a saw-toothed wave, etc. In that regard, the interferometric modulator is also a signal synthesizer in that the wave shape of the output signal can be changed and specifically designed by changing the waveshape of the signal from voltage signal source 14. Utilization of a piezoelectric crystal 32A with mirrored surface 34A rather than a fixed position mirror 38, and a second voltage source 14A provides even greater flexibility in forming the wave shape of the output signal.

Building on this interferometric technique for producing a modulated optical signal, three particular applications are especially suitable for its use, namely as a digital photonic clock, as a pulse width/amplitude modulator and as a bi-stable memory cell. The description of each application according to the invention is next separately presented.

Digital Photonic Clock

Figure 4:
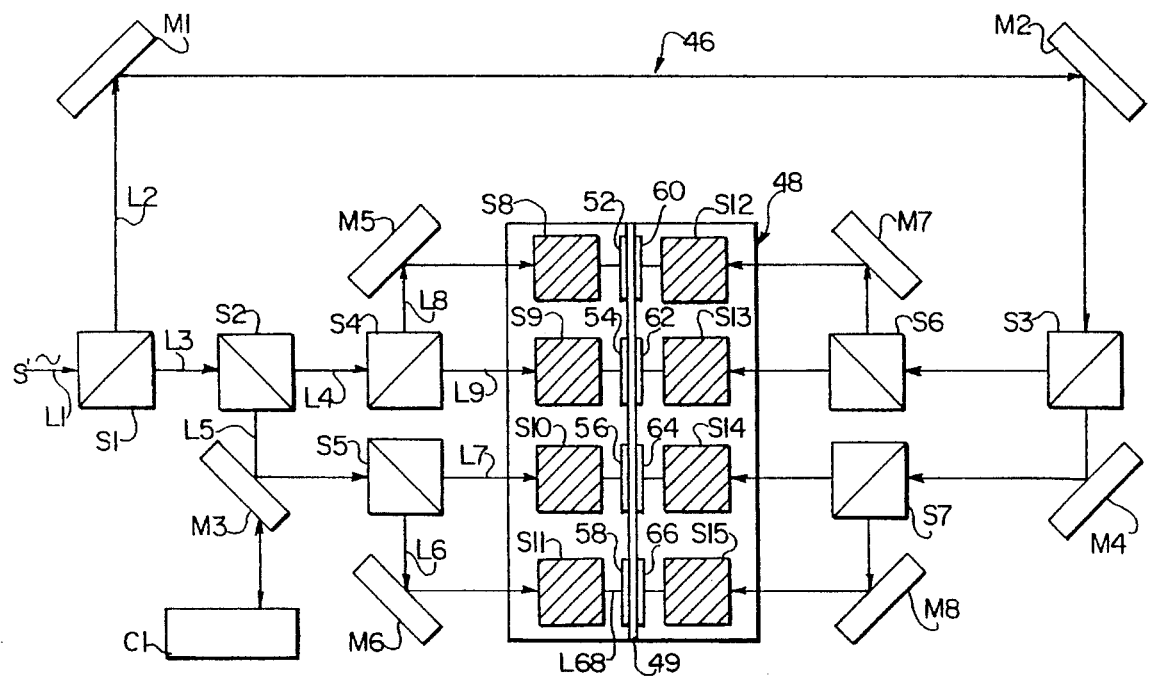
FIG. 4 is a partial top view of an arrangement of interferometric modulators according to the invention utilized as a digital photonic clock.

FIG. 4 illustrates a portion of an embodiment of the present invention in which an arrangement of interferometric modulators (labelled generally as 46) is utilized as a high speed digital photonic clock. A light source S' producing a monochromatic beam of light, such as from a laser, delivers a light beam along line L1 at an optical frequency $f_L$ as an input to the interferometric modulator. The interferometric modulator comprises, in part, beamsplitters S1, S2, S4 and S5, and reflective mirrors M3, M5 and M6 in the arrangement as shown on the left side of the structure of FIG. 4. The interconnecting lines represent paths of light between the beamsplitters and the mirrors.

A similar arrangement exists on the right side of the structure of FIG. 4 comprising beamsplitters S3, S6 and S7, and reflective mirrors M4, M7 and M8. Mirrors M1 and M2 are also positioned as shown, with the arrowed interconnecting lines again representing the path of light beams between the various elements.

Figure 5:
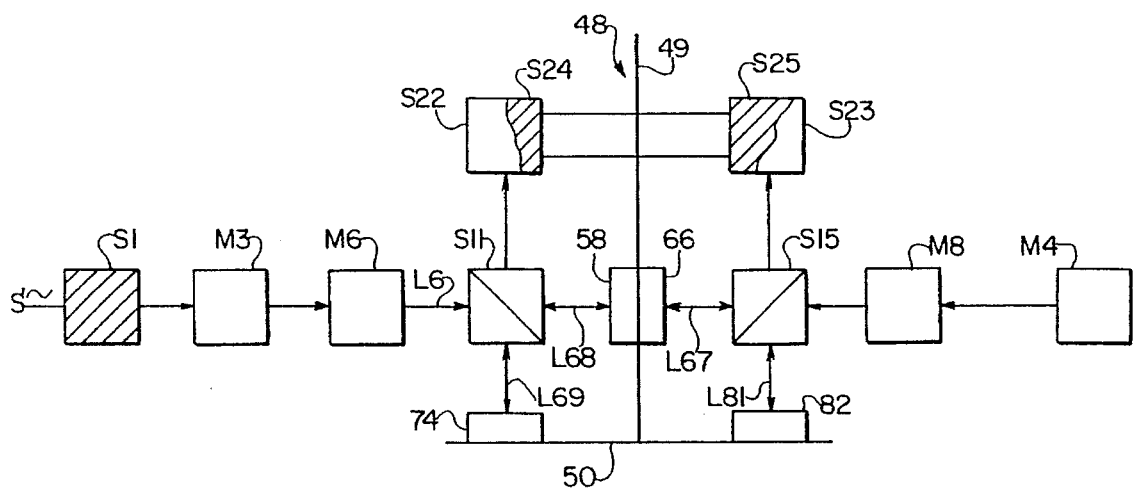
FIG. 5 is a front elevational view of the apparatus of FIG. 4.
Figure 6:
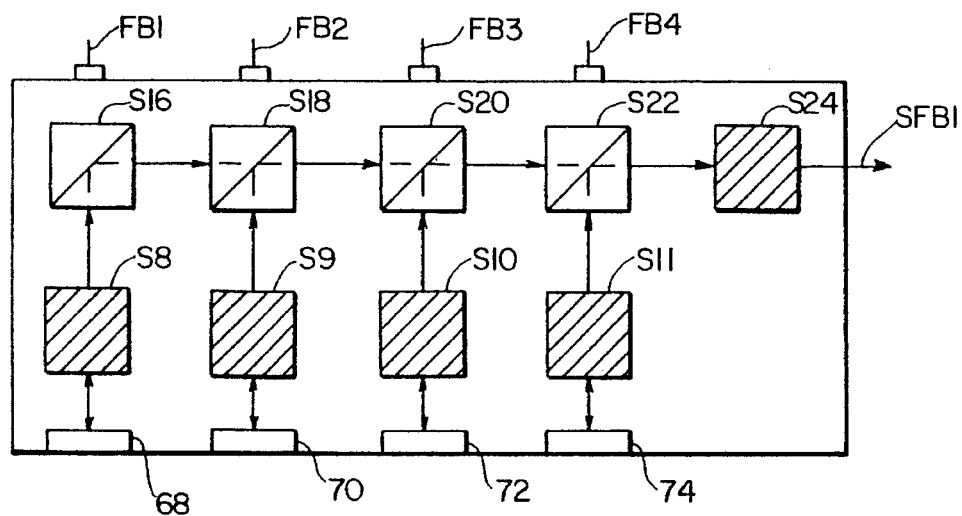
FIG. 6 is a partial side view of the apparatus of FIG. 4 showing the upper and lower beamsplitter arrangement.
Figure 8:
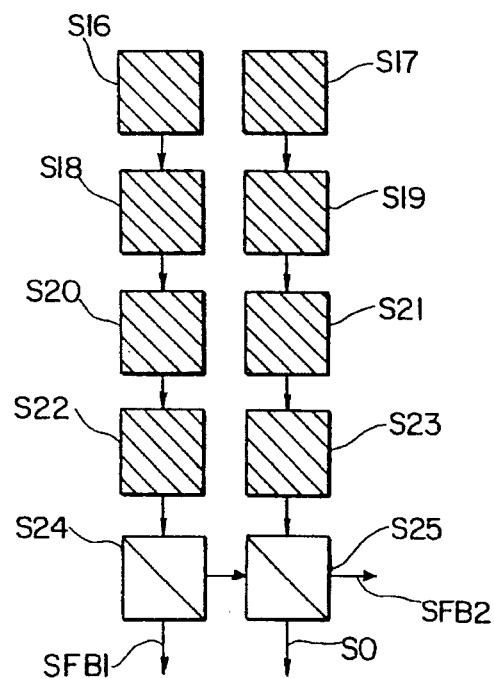
FIG. 8 is a partial top view of the apparatus of FIG. 4 showing only the arrangement of the upper set of beamsplitters.

In the center area of FIG. 4 is a rigid structure 48 in the form, primarily, of an inverted T-shape when viewed in the elevational view of FIG. 5. Structure 48 consists of a T-arm 49 extending vertically upright and a T-base 50, and additional structure (not shown). The T-shaped structure will, in practice, comprise the primary rigid mechanical framework against which the optical components are precision fit and supported with conventional mechanical spacers, brackets, guides and binding material. Mounted outward from either side of the rigid T-arm are two top sets and two bottom sets of beamsplitters. For illustration purposes, only the two bottom sets comprising beamsplitters S8, S9, S10 and S11 on the left side, and beamsplitters S12, S13, S14 and S15 on the right side of T-arm 49, are shown in FIG. 4. In reality, the top set of beamsplitters is mounted directly above the bottom set shown in FIG. 4. The top set of beamsplitters S16–S23 is shown in FIGS. 6 and 8, discussed hereinafter. In addition, the arrangement includes top beamsplitters S24 and S25, which are shown in FIGS. 5, 6 and 8, and discussed hereinafter. In each of the Figures the blocks depicting certain beamsplitters (e.g. S8–S15 in FIG. 4) are shaded to distinguish their orientation from the beamsplitters that are not shaded (e.g. S2–S7 in FIG. 4). Beamsplitters S8–S25 are mounted by means of ancillary mechanical components which extend from, and attach to the rigid mechanical structure 48. For clarity in the drawing, the ancillary mechanical components are not shown in FIG. 4.

FIG. 5 is a front elevational view of the digital photonic clock 46. Beamsplitters S22 and S23 are mounted directly above beamsplitters S11 and S15, respectively. Beamsplitters S24 and S25 are above and forward (out of the page as shown in FIG. 5) of beamsplitters S11 and S15, respectively. FIG. 5 shows the arrangement of two piezoelectric crystal pairs, with each one of the pairs positioned at a 90° angle to one another facing two sides of a beamsplitter. The function of the piezoelectric crystals can be described with reference to FIG. 5. For example, light beam L6 impinging on beamsplitter S11 is split into a transmitted portion L68 which impinges on, and is reflected from, crystal 58, and a reflected portion L69 which impinges on, and is reflected from, crystal 74. Both crystals 58 and 74 are connected to a voltage source, not shown in FIG. 5. The arrangement of piezoelectric crystals connected to a voltage source is shown in FIG. 3 and is discussed in more detail in connection with FIG. 3. The two signals reflected back from the crystals 58, 74 then recombine in beamsplitter S11 and are output from a fourth side of the beamsplitter, upwardly to impinge on beamsplitter S22 directly above beamsplitter S11.

The side elevational view of FIG. 6 also shows beamsplitter S22 located directly above beamsplitter S11. The upper set of beamsplitters comprises beamsplitters S16, S18, S20, S22 and S24 on the left side of T-arm 49 as shown in FIG. 6, and beamsplitters S17, S19, S21, S23 and S25 (FIG. 8) on the opposite side of T-arm 49. With the exception of beamsplitters S24 and S25, each upper beamsplitter receives recombined light signals from the respective beamsplitter positioned directly below it. The light beam signals are reflected and combined by the two top sets of beamsplitters according to the arrowed paths as shown in FIG. 6 with respect to elements on one side of T-arm 49. It is understood that a similar operation occurs with respect to the elements on the opposite side of the T-arm. Intermediate signals from beamsplitters S16, S18, S20, S22 and S24 may be fed back on lines FB1, FB2, FB3, FB4 and SFB1, respectively for analysis and control by a controller (e.g. servo-control C1 in FIG. 4).

Figure 7:
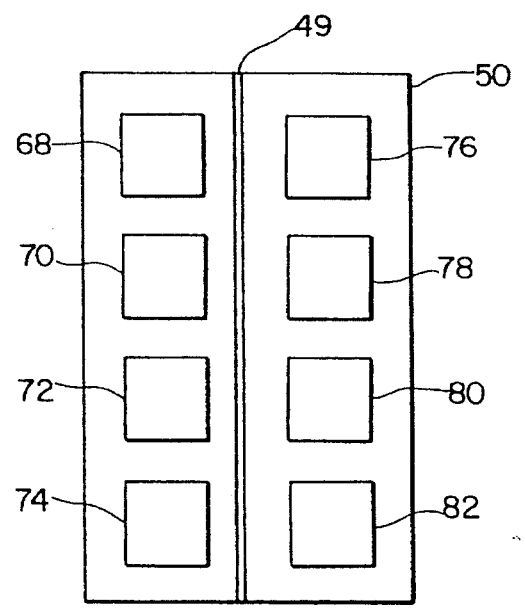
FIG. 7 is a partial top view of the apparatus of FIG. 4 showing only the bottom piezoelectric crystal arrangement.

FIG. 7 illustrates the position of the piezoelectric crystals mounted on T-base 50, with crystals 68, 70, 72 and 74 on the T-base on the left side of T-arm 49, and crystals 76, 78, 80 and 82 on the T-base to the right side of T-arm 49. FIG. 8 illustrates the position of the upper set of beamsplitters, which comprises beamsplitters S16–S25. Another intermediate feedback signal can also be provided on line SFB2 as shown in FIG. 8. The final optical square wave signal is provided on line S0. This signal may be utilized as a digital photonic clock signal for a computer CPU, for example. The assembly mounted to structure 48 thus comprises 16 piezoelectric crystals and 18 beamsplitters in the arrangement as depicted in FIGS. 4–8.

Each beamsplitter S8–S15 has associated with it two piezoelectric crystals positioned at a 90° angle to one another. FIG. 4 shows eight piezoelectric crystals attached flush on either side of T-arm 49 of structure 48, each facing a respective beamsplitter. With reference to FIG. 4, piezoelectric crystals 52, 54, 56 and 58 are positioned on the left side of T-arm 49, and piezoelectric crystals 60, 62, 64 and 66 are positioned on the right. The remaining eight piezoelectric crystals are positioned directly below each beamsplitter S8–S15 and therefore are not visible in FIG. 4. FIG. 7 illustrates these remaining crystals 68, 70, 72, 74, 76, 78, 80 and 82. Each piezoelectric crystal has a mirrored finished surface for reflection of any light beam that impinges on it. Light beams that impinge on each crystal are due to the alignment between a beamsplitter and its respective pair of piezoelectric crystals, e.g., beamsplitter S8 and piezoelectric crystals 52 and 68, beamsplitter S9 and piezoelectric crystals 54 and 70, etc. Due to space limitations in the drawing of FIG. 4, only the light beam line between piezoelectric crystal 58 and beamsplitter S11 is identified by number L68, although it is understood that the other similar connecting lines are likewise representative of light beams passing between piezoelectric crystals and their associated beamsplitter. See, for example, FIG. 5 which illustrates light beams L68 and L69 between beamsplitter S11 and its respective crystal pair 58 and 74, and light beams L67 and L81 between beamsplitter S15 and its respective crystal pair 66 and 82.

Mirrors M1 and M2 provide an optical connecting path for a beam of light between beamsplitter S1 on the left side of FIG. 4 and beamsplitter S3 on the right side of FIG. 4.

In operation, a coherent, focused monochromatic beam of light from source S' is received by the interferometric modulator as an input signal incident on beamsplitter S1. It is understood that beam of light L1 could also be comprised of several monochromatic beams which are coherent within each monochromatic beam.

Beamsplitter S1 divides the light beam into two equal, orthogonal beams L2 and L3, having a phase difference of approximately π, for example, between them upon leaving the transmitting/reflecting interface of beamsplitter S1. Light beam L2, as the reflected portion of light beam L1, is reflected by fully reflective mirrors M1 to M2 and then to beamsplitter S3. The transmitted portion L3 of the light beam from beamsplitter S1 impinges upon beamsplitter S2.

From this point on, the operation is duplicated on both sides of the rigid structure 48. The discussion which follows only describes the steps which occur with respect to the beamsplitters, mirrors, and piezoelectric crystals on the left side of T-arm 49, with it being understood that a duplicate operation is also occurring throughout the analogous components on the right side of T-arm 49.

Light beam L3 is split by beamsplitter S2 with the reflected portion represented by light beam L5, which is reflected by mirror M3 and thereafter impinges on beamsplitter S5. The transmitted portion L4 of light beam L3 impinges on beamsplitter S4.

The precise positioning of mirror M3 is adjustable by means of an opto-electronic monitoring circuit C1 comprising a conventional electro-mechanical servo-control. The feedback for this servo-control is provided by comparing the feedback signals on lines FB1 and FB2 with FB3 and FB4 (FIG. 6). By doing so, the phase of the light beam L5 reflected off mirror M3 to the transmitted portion of light beam L3, light beam L4, is appropriately matched. Mirrors M5 and M6 can be adjusted by similar means. The associated adjustment circuitry, which is conventional, is not shown in FIG. 4. The matching functions for these adjustments are empirically determined using feedback signals FB1, FB2 and FB3, FB4; FB1 and FB2; FB3 and FB4. The physical adjustments are made by varying the optical path length values between beamsplitter S2 and mirror M3, beamsplitter S4 and mirror M5, and beamsplitter S5 and mirror M6, respectively. Similar adjustments may be made to mirror M1 to match collective phases of signals on the right half of T-arm 49 to those on the left side of T-arm 49. Feedback signals SFB1 and SFB2 are used to measure the effectiveness of this adjustment.

The beam of light incident on beamsplitter S5 is split into a transmitted portion L7 and a reflected portion L6. The reflected light beam L6 is reflected by mirror M6 and impinges on beamsplitter S11. The transmitted portion L7 impinges on beamsplitter S10. A similar operation occurs with the beam of light L4 incident on beamsplitter S4 where it is split into a reflective light beam L8 which is reflected by mirror M5 and impinges on beamsplitter S8. The transmitted light beam L9 impinges on beamsplitter S9. With a similar and analogous operation having occurred throughout the components to the right side of structure 48, beamsplitters S8–S15 each receive a light beam. The orientation of beamsplitters S8–S15 is such that a portion of the received light is reflected downward (into the page). A portion of the received light is transmitted to the right of each of beamsplitters S8–S11. A portion of the received light is transmitted to the left of each of beamsplitters S12–S15. Both the reflected and transmitted portions of the light beams from each of beamsplitters S8–S15 impinge upon a surface of a piezoelectric crystal. As previously discussed, each of beamsplitters S8–S15 has associated with it a pair of piezoelectric crystals that are positioned at a 90° angle to one another.

The next process that occurs at each of the beamsplitters S8–S15 is identical where eight beams of light, whose amplitudes may be adjusted through the use of neutral density filters (not shown) in select light paths, are received by the eight separate beamsplitters. Therefore only operations involving beamsplitter S11 will be discussed as follows, such operations being representative of the action occurring at each of the beamsplitters S8–S15.

As best shown in FIG. 5, light beam L6, incident on beamsplitter S11, is split into two paths, one reflected beam L69 goes downward to piezoelectric crystal 74. The transmitted portion of the beam L68 impinges on piezoelectric crystal 58. The two light beams from beamsplitter S11 are each incident on a mirrored surface of the two piezoelectric crystals 74 and 58 associated with beamsplitter S11. Further, the piezoelectric crystals are oscillating at a specified frequency and amplitude, determined by a control voltage applied to the piezoelectric crystals (as shown in and discussed with reference to FIG. 3). Each pair of crystals, one pair for beamsplitter S8, one pair for beamsplitter S9, etc., up to beamsplitter S15, oscillate at different specified frequencies which are prescribed .harmonics of a fundamental frequency. Typically, the fundamental frequency drives one pair of piezoelectric crystals, e.g. 74 and 58 for beamsplitter S11.

The phase relationship between the two crystals associated with any one of the beamsplitters S8–S15 is adjustable, or tunable, to optimize the output signal of each component. The two beams of light reflected from each of the two piezoelectric crystals associated with beamsplitter S11 are recombined at S11 due to their reflection from the mirrored surface of the two piezoelectric crystals. The phase, amplitude and frequency of the control voltage applied to the piezoelectric crystal, which determines the position and speed of the mirrored surface thereof, are adjusted to produce a sinusoidal optical signal as the output of the two recombined signals from beamsplitter S11. The amplitude of the mechanical motion of the surface of a piezoelectric crystal produces a sinusoidal signal with a frequency that is 100 to 1,000 times the frequency of the signal from the voltage source. In other words, the mechanical motion of the mirrored surface of the crystal is determined by the voltage, and has a distance of movement (amplitude) of 50 to 500 times lamda, where lamda is the wavelength of the carrier light source S'. The maximum optical path length difference at each beamsplitter interface is 2 times the mechanical peak-to-peak amplitudes of the mirrored surfaces when the optical axis is normal to the mirrored surface. This produces an output signal from the recombined light beams having a frequency $f_2$ contribution=(100 to 1,000) $f_t$ from each arm of the interferometric modulator, where $f_t$ equals the driving frequency.

Empirically obtained adjustments are made to optimize the clock performance as a function of the change in path length traversed by the light as a result of the motion of the mirrored surfaces of the piezoelectric crystals. That change in path length is equal to twice the peak to peak difference in the mechanical amplitude of the mirrored surface along each optical path.

In the preferred embodiment, the control voltage signals applied to the piezoelectric crystals are sine waves where the phase difference between control voltages signals on each pair is π/2. For example, the control voltage signal applied to crystal 74 will be π/2 out of phase with the control voltage signal applied to crystal 58. However, other signals could also be used for producing a desired digital or arbitrarily shaped output.

The sinusoidal signals that result after reflection from the mirrored surfaces of the piezoelectric crystals, and as a result of their recombination in the respective beamsplitters S8–S15 is called classical interferometry. The resulting digital signal output signal occurs as specific contributions of sinusoidal light signals of specified frequency and amplitude are combined to produce a final output signal. This final output signal is the superposition or combining of each of the sinusoidal input signals. If the appropriate values of amplitude, phase and frequency of the driving signals are correctly applied to each piezoelectric crystal, then the superposition of the sinusoidal signals will be a digital signal. The digital clock signal is produced as output signal S0 from beamsplitter S25 in FIG. 8. The appropriate amplitude, phase and frequency values of the driving signals must be obtained empirically. Consider, for example, the superpositioning of the first (e.g. on crystal pair 52/68), third (e.g. on crystal pair 54/70), fifth (etc.), seventh, ninth, eleventh, thirteenth and fifteenth harmonics of a known fundamental, i.e., the first harmonic sine wave, with the amplitudes of each subharmonics adjusted to optimize the digital output. This optimization can be achieved by adjusting the phase, relative amplitude and/or frequency of each signal applied to each set of piezoelectric crystals that correspond to a particular beamsplitter. This optimization may also be achieved in part by adjusting the thickness (strength) of the neutral density filters used to regulate the amplitude of each light beam. The optimal result is achieved through empirical tests.

An Optical Pulse Width/Amplitude Modulator

The use of the interferometric modulator of the present invention together with appropriate electro-mechanical servo-controls can be applied to produce an optical pulse width modulator with a modulating capability from a>0% to a<100% duty cycle for a symmetric square wave optical input with negligible slew loss. Such an optical modulator incorporates multistage phase inversion and recombination to achieve the desired results. The structure of the device offers added versatility in that it may be implemented, not only as a dynamically controlled pulse width modulator, but also as a fixed width precision frequency doubler, or as an optical digital signal rectifier.

Figure 9:
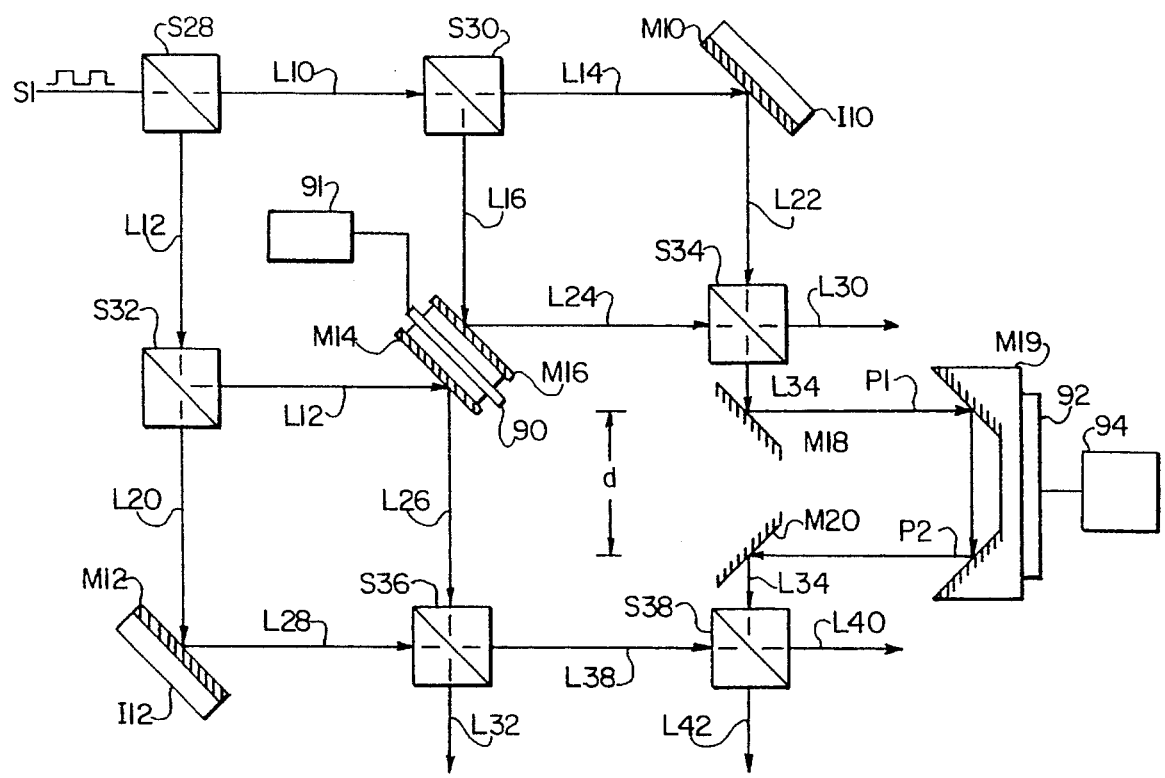
FIG. 9 is a depiction of a top view of an arrangement of interferometric modulators according to the invention used as a pulse width/amplitude modulator.

This application of the present invention comprises a light source S1, used with an arrangement of beamsplitters S28, S30, S32, S34, S36 and S38 in the arrangement as depicted in FIG. 9. The apparatus also comprises mirrors M10, M12, M14, M16, M18, M19 and M20 as shown in FIG. 9. The arrowed lines between the various components of FIG. 9, starting with light source S1, represent beams of light passing in the arrowed directions as indicated between the various components of the device according to the invention.

In operation as a full square wave pulse width/amplitude modulator, light from a single, coherent light source S1 (e.g. optical digital signal S0 from beamsplitter S25 in FIG. 8) is incident on beamsplitter S28, where the light beam is separated into two independent paths indicated by the transmitted light portion L10 and the reflected light portion L12. Light beam portion L10 is incident upon beamsplitter S30 which causes it to split again into two independent halves as indicated by transmitted light beam portion L14 and reflected light beam portion L16. In a similar manner, light beam L12, which is incident on beamsplitter S32, is split into the two independent paths of transmitted light beam portion L20 and reflected light beam portion L18.

The transmitted light beam portion L14 and reflected light beam portion L16 are each reflected by mirrors M10 and M16, respectively. Mirror M16 is one side of a central reflecting mirror mounted on a piezoelectric crystal 90, which is controlled by voltage source 91. The crystal 90 is mounted on a stationary support which is central to the apparatus shown in FIG. 9. Reflected light beams L22 and L24 are recombined at beamsplitter S34. The recombination of light beams at S34 represents a first stage of the modulator and the components S28, S30, M10, M16 and S34 are one leg of this first stage.

The second leg of the first stage involves beamsplitter S32. Transmitted light beam portion L20 and reflected light beam portion L18 (from beamsplitter S32) impinge on and are reflected by mirrors M12 and M14, respectively.

Reflected light beams L26 and L28 are recombined at beamsplitter S36 as the second leg of the first stage of the modulator. In either leg of the first stage, output light beams L30 (from beamsplitter S34) or L32 (from beamsplitter S36) may be a product signal or used as a feedback test point for adjustment and control of the modulator.

Figure 10:
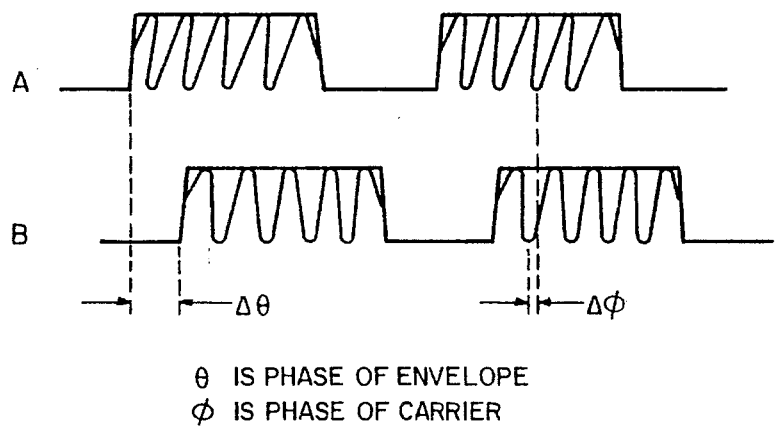
FIG. 10 illustrates the phase relationships of signals from each leg of the modulator shown in FIG. 9.

It should be noted that mirrors M10 and M12 could each be replaced with full interferometers illustrated only as I10 and I12 in FIG. 10. Each interferometer I10 and I12 would comprise a single beamsplitter and two mirrors on opposing optical paths. If this enhancement were incorporated for a specific application, the position of each mirror would be controlled using a piezoelectric crystal. This enhancement would permit the independent adjustment of the signal strength/pulse width of a single leg of either first stage side of the modulator.

As shown in FIG. 9, output light beam L34 is incident on mirrors M18, M19, and M20. Mirror M19 is a two-faced reflector which reflects the incident light along an output path P2 that is parallel to the input path P1, the input and output paths being displaced a distance d, as shown in FIG. 9. The position of compound mirror M19 is controlled by piezoelectric crystal 92, which is mounted to mirror M19 and connected to a voltage source 94, which generates a signal of given amplitude and frequency. This configuration permits the independent adjustment of one leg (e.g. light beam L34) of the second stage of the modulator relative to the other leg (i.e. light beam L38). Signals L32 and L38 are analogous to signals L30 and L34, respectively, except for the phase difference introduced by differing optical path lengths.

A final output signal is available at each of the two faces of beamsplitter S38. The form of these output signals L40 and L42 is a function of the input signals L38 and L34. The relative phase and amplitude of these input signals are adjusted by mirrors M14, M16, M19, and optionally M10 and M12. Each of these mirrors may have their relative positions changed by a piezoelectric crystal (e.g. 90 and 92) under control of a voltage source (e.g. 91 and 94). The exact adjustment of the mirrors to achieve an optimal result is determined empirically, as is conventional. Neutral density filters, not shown, are optional for calibration.

Figure 11:
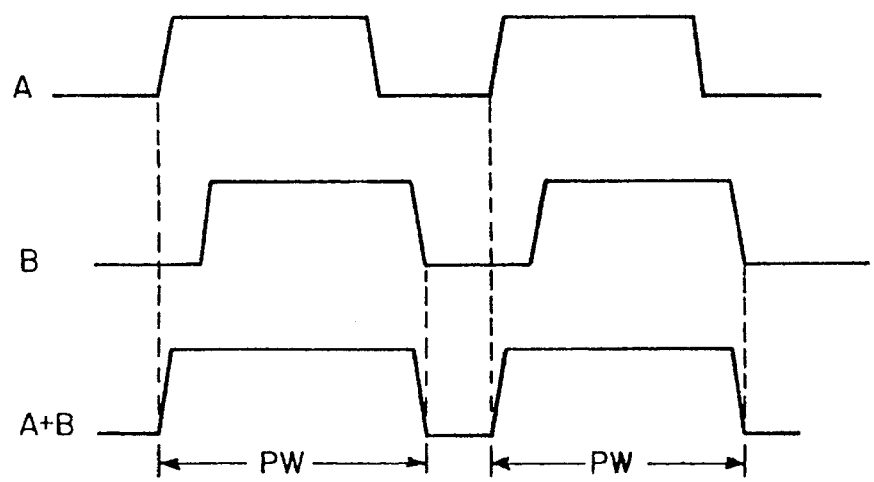
FIGS. 11, 12 and 13 illustrate possible output signal waveforms when the modulator shown in FIG. 9 is utilized as a pulse width modulator, digital frequency modulator and amplitude modulator, respectively.

FIG. 10 illustrates and defines certain relationships which will help to describe the various functions which the embodiment of FIG. 9 is capable of performing. As mentioned previously, the relative phase and amplitude of the input signals L34 and L38 will determine the shape of the output signals L40 and L42. These input signals will be an optical digital signal, as in the form of S1. This digital signal is an envelope for the underlying carrier signal that is in the form of a sinusoid, such as S' in FIG. 4 and A and B in FIG. 10. The relative phase of the digital signal envelope of one input signal to the other and the relative phase of the carrier signal of one input signal to the other will determine the shape of the output signals L40 and L42. These phase relationships are adjusted by the mirrors of FIG. 9, with specific adjustments to achieve specific phase relationships being determined empirically. Referring to FIGS. 9–11, the phase difference between the digital signal envelopes of the two input signals L34 of FIG. 9 (e.g. A in FIG. 10), and L38 of FIG. 10 (e.g. B in FIG. 10) is shown as $\Delta\Theta$. The phase difference between the carrier signals of the two input signals L34 and L38 is shown as $\Delta\phi$ FIG. 11 illustrates the summing of two digital signals with envelope phase difference of $\pi/4$ and carrier signal phase difference of $\pi/2$ to generate a combined signal of approximately equal amplitude as each signal and pulse width increase of 150%.

Figure 13:
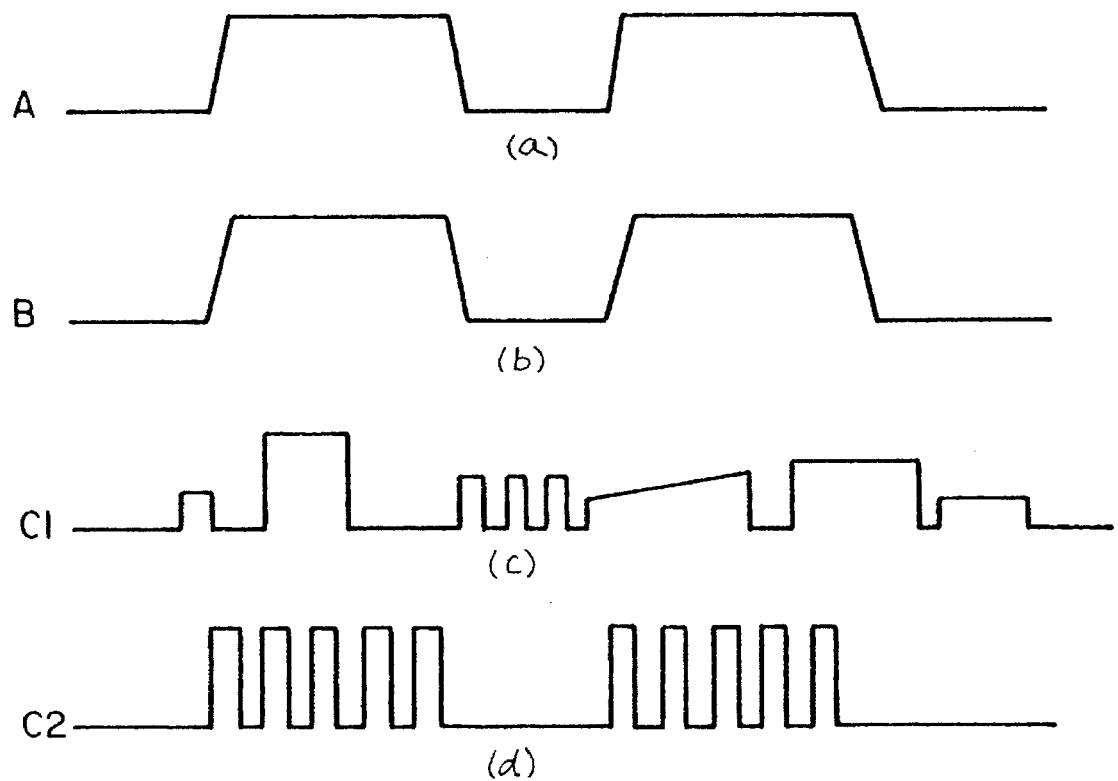

FIG. 13 illustrates that by changing the phase differences in the envelope and carrier signals, through adjustment of the mirrors, the embodiment of FIG. 9 can be utilized as a pulse width modulator 13A, frequency doubler 13B, amplitude modulator 13C, and a pulse/phase inverter 13D. In these figures only the phase shift $\Delta\phi$ in the digital signal envelope is depicted, for simplicity. The value of the carrier phase difference $\Delta\Theta$ is provided. A $\Delta\Theta=\pi/2$ value maintains approximately constant signal strength.

FIG. 11 illustrates the utilization of the apparatus of FIG. 9 as a pulse width modulator through adjustment of the mirrors, described previously, so that the phase difference of the envelope is $\pi/2$ and the phase difference of the input carrier signals is $\pi/2$. For example the wave form A of FIG. 11 is the input signal L38 of FIG. 9 from one leg of the first stage of the modulator, wave form B is input signal L34 from the other leg, and the wave form resulting from A+B is the output signal L42 or L40 from the second stage beamsplitter (i.e. beamsplitter S38). In this example, the pulse width of the output (PW in FIG. 11) is greater than (approximately 150%) the pulse width of the input signals. With the configuration of FIG. 9 it is possible to have pulse width modulation with a duty cycle from>0 to<1.

Figure 12:
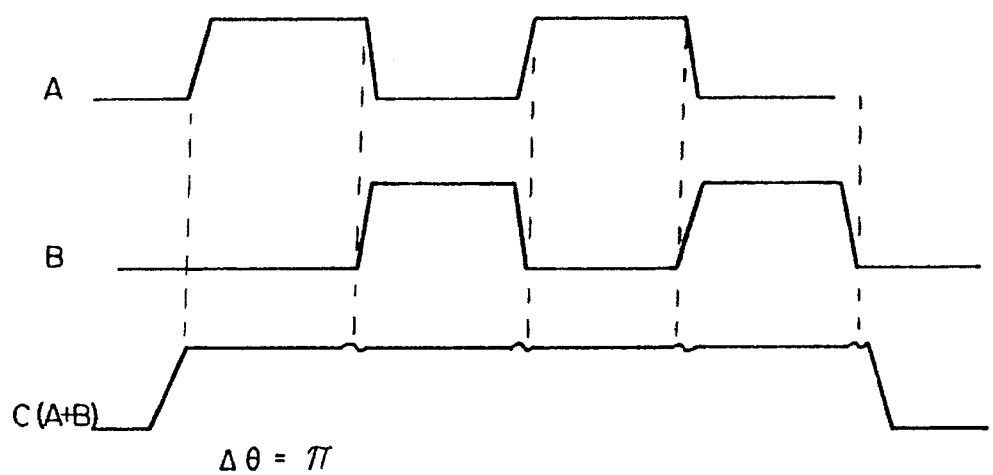
Figure 12:
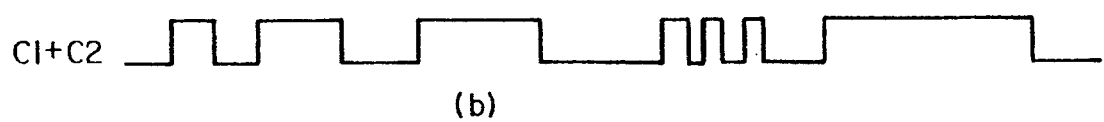

FIG. 12 illustrates the utilization of the apparatus of FIG. 9 as a digital frequency modulator. First, it must be assumed that one or both input signals L32 and L34 are tuned full wave pulses with approximately a 100% duty cycle, i.e. in the shape of wave form C in FIG. 12a. This wave form could be achieved using either first stage of the apparatus of FIG. 9 as a pulse width modulator which yields a full wave pulse. Each full wave pulse (C in FIG. 12a), e.g. L34 and L38 of FIG. 9, would be fed into a second stage modulator which will act as the frequency modulator. Alternately, one full wave pulse (C in FIG. 12A), e.g. L34 or L38 of FIG. 9, would be combined with a pulse width modulated signal (A+B in FIG. 11), e.g. L38 or L34 of FIG. 9, to be fed into a second stage modulator which will act as a digital signal frequency modulator. If inputs L32 and L34 are in the shape of wave form C in FIG. 12a and if piezoelectric crystal 92 is modulated in a controlled fashion, e.g. such that $A_1 \sin \tau_1 t = A_2 \sin (\tau_2 t \pm (2\mu+1)\pi)$ (minimum interference condition) the signal amplitude is approximately zero or $A_1 \sin \tau_1 t = A_2 \sin (\tau_2 t \pm 2\pi)$ (maximum interference condition) the signal amplitude is maximized at approximately $A_1 + A_2$ where $\tau_1$ and $\tau_2$ are optical carrier frequencies, t=time, $A_1$ and $A_2$ are optical carrier amplitudes and $\mu$ is an integer value$\geq 0$. If it is assumed that $A_1 \sin \tau_1 t = A_2 \sin (\tau_2 t + ((2\mu+1)/2)\pi)$ then, when inputs L32 (e.g. C1) and L34 (e.g. C2) are combined at beamsplitter S38 the output signal L40 or L42 will be in the wave form of FIG. 12a, labelled C1+C2. If a second modulating signal (also a digital signal) is introduced, such that a phase difference of $\phi$ or $((2\mu+1)/2)\pi$ is added to $A_2 \sin (\tau_2 t + ((2\mu+1)/2)\pi)$ such that $A_1 \sin \tau_1 t = A_2 \sin (\tau_2 t + ((2\mu+1)/2)\pi + \gamma((2\mu+1)/2)\pi)$ where $\gamma$ is the envelope frequency of the modulating digital signal, then a frequency modulated digital signal such as shown in FIG. 12b is possible, and the frequency modulation will be a function of $A_1$, $A_2$, $\tau_1$, $\tau_2$, and t.

FIG. 13 illustrates the utilization of the apparatus of FIG. 9 as an amplitude modulator. In this application the phase shift of the envelope will be near zero and remain effectively constant. The phase shift of the carrier will be variable. Thus when the input signals L38 (e.g. A in FIG. 13) and L34 (e.g. B in FIG. 13) may be combined to yield a resultant signal which is a multiplexed or a frequency modulated digital signal (C2 in FIG. 13). A phase/amplitude modulated signal (FIG. 13, C1) is also possible.

Various other applications of the interferometric modulator of FIG. 9 will occur to those having skill in the art. For example, pulse width modulation of the input signal S1 is provided when the signals L32 and L34 are digital waveform signals and the piezoelectric crystal 92 is modulated in a controlled fashion such that the carrier signal phase difference is maintained at approximately $\pi/2$ for each stable state time duration of the modulating signal and the phase difference in the digital waveform phase difference varies between 0 and $2\pi$. Amplitude modulation is provided when the phase difference in the digital waveforms is zero and the carrier signals phase difference is variable between 0 and $2\pi$. A precision frequency doubler is provided when the phase difference in the digital waveforms is $\pi/2$ and the carrier signals phase difference is $\pi$. A precision frequency doubler can function as a precision frequency quadrupler by introducing a phase difference in the primary (e.g. L28, L22) and secondary (e.g. L26, L24) signals such that the digital waveform phase difference is $\pi/2$ and the carrier signal phase difference is $\pi$ at each leg of the first stage and at the second stage simultaneously.

An Optical Memory Cell

Figure 14:
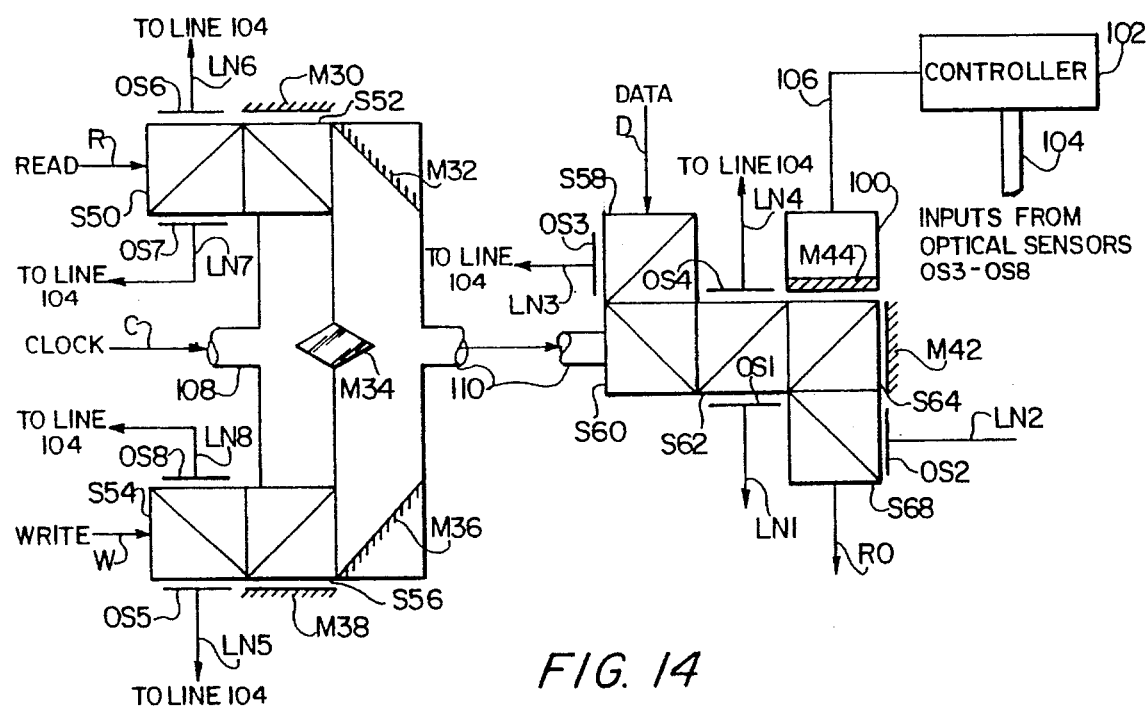
FIG. 14 illustrates the optical memory cell embodiment of the present invention.

A further embodiment of the present invention utilizes the basic interferometric modulator principles of the present invention, described previously, to provide a bi-stable interferometric cell that functions as an optical memory. FIG. 14 illustrates this embodiment, which utilizes a conventional programmable controller 102. Controller 102 is programmed in a conventional manner to interpret signals on input line 104, which may be a multi-conductor wire or a multi-conducting fiber optic cable for receiving inputs from optical sensors (e.g. photo sensors) OS3–OS8.

The following state table for FIG. 14 shows an example process interpretation for controller 102 based upon the binary state of optical sensor inputs OS3–OS8.

| | | | | | | | STATE TABLE | |
|---|---|---|---|---|---|---|---|---|
| | CONTROLLER INPUTS OS- | | | | | | MEMORY CONTENTS | DESCRIPTION |
| STATES | 3 | 4 | 5 | 6 | 7 | 8 | OS2 | OPERATION |
| 1 | 0 | 0 | 0 | 0 | 1 | 1 | — | N/A |
| 2 | 0 | 0 | 0 | 1 | 1 | 1 | — | N/A (STATE NOT ATTAINABLE/OS4 FAILURE) |
| 3 | 0 | 0 | 1 | 0 | 1 | 1 | — | N/A (STATE NOT ATTAINABLE/OS4 FAILURE) |
| 4 | 0 | 0 | 1 | 1 | 1 | 1 | — | TBD (e.g. WAIT STATE) |
| 5 | 0 | 1 | 0 | 0 | 1 | 1 | — | TBD (e.g. FAULT, OS3 FAILURE, CLOCK NOT IN SYNC) |
| 6 | 0 | 1 | 0 | 1 | 1 | 1 | 0,1 | READ MEMORY CONTENT |
| 7 | 0 | 1 | 1 | 0 | 1 | 1 | 0 | WRITE 0 TO MEMORY |
| 8 | 0 | 1 | 1 | 1 | 1 | 1 | — | FAULT READ/WRITE ERROR |
| 9 | 1 | 0 | 0 | 0 | 1 | 1 | — | TBD (e.g. FAULT, OS4 FAILURE) |
| 10 | 1 | 0 | 0 | 1 | 1 | 1 | — | TBD (e.g. FAULT, READ/DATA SYNC ERROR) |
| 11 | 1 | 0 | 1 | 0 | 1 | 1 | — | TBD (e.g. FAULT, WRITE/DATA SYNC ERROR) |
| 12 | 1 | 0 | 1 | 1 | 1 | 1 | — | TBD (e.g. FAULT, READ/WRITE ERROR, SYNC ERROR) |
| 13 | 1 | 1 | 0 | 0 | 1 | 1 | 0,1 | LOGIC PROCESS, CONDITIONAL DATA PASS |
| 14 | 1 | 1 | 0 | 1 | 1 | 1 | 0,1 | LOGIC PROCESS, READ MEMORY AND DATA PRESENT |

-continued

STATE TABLE

| | CONTROLLER INPUTS OS- | | | | | MEMORY CONTENTS | DESCRIPTION |
|---|---|---|---|---|---|---|---|
| STATES | 3 | 4 | 5 | 6 | 7 | 8 | OS2 | OPERATION |
| 15 | 1 | 1 | 1 | 0 | 1 | 1 | 1 | WRITE 1 TO MEMORY |
| 16 | 1 | 1 | 1 | 1 | 1 | 1 | — | READ/WRITE ERROR INPUT DATA LOST |
| 17 | X | X | X | X | 1 | 0 | FAULT, LOCAL CLOCK INTERFACE FAILURE, WRITE SIDE |
| 18 | X | X | X | X | 0 | 1 | FAULT, LOCAL CLOCK INTERFACE FAILURE, READ SIDE |
| 19 | X | X | X | X | 0 | 0 | FAULT, CLOCK FAILURE, CLOCK/SYNC FAILURE |

N/A - NOT APPLICABLE
— - INDETERMINATE
TBD - TO BE DETERMINED

The controller 102 generates an output signal, e.g. either electrical (i.e. a voltage level) or optical (i.e. an intensity level) on line 106. The signal on line 106, the level of which is controlled by controller 102, is applied to piezoelectric crystal 100, which responds by expanding or contracting in the dimension normal to the mirrored surface M44. In the case of an optical input signal, the piezoelectric crystal must also be made photosensitive either through attachment of a CCD, photovoltaic cell, or by doping the piezoelectric ceramic directly. This change in position of the mirrored surface M44 causes a change in the optical path length from mirrored surface M44 to the beam splitting interface of beamsplitter S64. When the apparatus of FIG. 14 is utilized as an optical memory, beamsplitter S64 functions as the "storage cell" with its contents being detected by optical sensor OS2 (e.g. photo sensor), which can be connected to a control or input/output device (not shown) by line LN2.

In the state table for FIG. 14, the contents of the memory or storage cell as indicated by OS2 with 0 indicating no light signal detection and 1 indicating light signal detection. The contents of the memory cell is determined by controller 102 which processes inputs from optical sensors OS3–OS8 and applies a signal on line 106 to change the optical path length as a pre-programmed response to inputs from optical sensors OS3–OS8 and thereby determine if light is (1) or is not (0) detected by optical sensor OS2. The state table of FIG. 14 indicates a preferred interpretation of the process which could be implemented in an optical memory according to the apparatus of FIG. 14. Controller 102 could be programmed using conventional and straightforward techniques to provide other processing results. Using six controller inputs, OS3–OS8, 64 states are possible. It should be noted that although the state table shows only 19 states, states 17, 18, and 19 may be expanded into further states to cover specific values of x for signal lines OS3–OS6. States 17–19 are required to handle ambiguities in the clock signal since this signal, in the design of the present invention, should interfere destructively on recombination at the beamsplitting interface of S60.

The operation of the apparatus of FIG. 14, in accordance with the preferred process interpretation of the state table above, will now be discussed. The input signal on line C is an optical CLOCK signal produced by a digital photonic clock such as the digital photonic clock of the present invention, as previously described. The input READ and WRITE signals on line R and W respectively are also digitized optical signals. In accordance with the preferred state table of FIG. 14, a WRITE signal impinges on beamsplitter S54, and a CLOCK signal (in phase with the WRITE signal) is received on line C and travels along fiber optic 108 and is split and reflected by mirrored surface M34. These WRITE and CLOCK signals combine at the beamsplitting interface of beamsplitter S56.

The WRITE signal is detected by optical sensor OS5, which is connected to controller 102 by lines LN5 and 104. A portion of the WRITE signal is reflected by the beamsplitting interface of beamsplitter S54 and is detected by OS5, and a portion of the WRITE signal is transmitted to beamsplitter S56. A portion of the CLOCK signal is reflected by beamsplitter S56 and again by beamsplitter S54. This reflected portion of the clock signal is detected by optical sensor OS8 and is used in fault detection processing. The transmitted portion of the CLOCK signal from beamsplitter S56 is reflected by static mirror M38 and is then reflected again by beamsplitter S56. Mirror M38 is static for purposes of digital signal processing. However, it is contemplated that mirrors M30, M32, M36, and M38 would be movable for the purposes of both off-line calibration and dynamic calibration as an overhead process. This movement may be accomplished by attached piezoelectric crystals. The calibration methods and specific apparatus used will be a function of the specific application. The portion of the CLOCK signal reflected by M38 and subsequently by S56 combines in phase with the transmitted portion of the WRITE signal. The superposition of these signals is reflected by mirror M36 and then by multifaceted mirror M34. This signal is combined with the portion of the CLOCK signal that is transmitted by beamsplitter S52, reflected by static mirror M30, reflected again by beamsplitter S52, and then by mirror M32, and finally by one of the surfaces of mirror M34.

Due to the phase relationship of the CLOCK signal and WRITE signal, the two CLOCK signal portions that are recombined and transmitted through optical fiber (or waveguide) 110 and the WRITE signal interfere with each other such that only the WRITE signal remains to impinge upon the interface of beamsplitter S60. In the apparatus of FIG. 14, the CLOCK signal acts as a synchronizing signal for the control signal (WRITE) and the data signal to be discussed hereinafter. As discussed, the synchronizing signal (CLOCK) is effectively removed, thus preserving the integrity of the control (WRITE) signal and data signal. The phase of the CLOCK and WRITE signals are maintained by dynamic calibration of mirrors M30, M32, M36, and M38 in response to the optical sensor signals from OS5, OS6, OS7, and OS8 (see state table of FIG. 14).

The DATA signal on line D is gated into the apparatus of FIG. 14 using the same CLOCK signal. For simplicity, the apparatus for gating the DATA signal, which is identical to the apparatus for gating the WRITE signal, is not illustrated in FIG. 14. A portion of the DATA signal that is clocked in is reflected by beamsplitter S58 and detected by optical sensor OS3, which is connected to controller 102 by lines LN3 and 104. The transmitted portion of the DATA signal is combined with the WRITE signal at the interface of beamsplitter S60. These signals interfere constructively, at the beamsplitting interface of beamsplitter S60. Beamsplitter S60, oriented as shown relative to beamsplitters S58 and S62, provides an optical isolation stage. This preferred orientation isolates the control signals from the data signals in this preferred arrangement. Note that the relative orientations of beamsplitter pairs S50, S52 and S54, S56 also provide optical signal isolation. The resultant signal is reflected and transmitted by beamsplitter S62. The reflected portion is detected by optical sensor OS4, which is connected to controller 102 by lines LN3 and 104. The transmitted portion is incident on beamsplitter S64. Optical sensor OS1 is provided for optional control and/or feedback and could be connected to a controller or input/output device (not shown) via line LN1.

As mentioned previously, beamsplitter S64 functions as the storage cell of this optical memory device. In accordance with the state table of FIG. 14, controller 102 is programmed so that if states 7 or 15 occur, the value detected by optical sensor OS3 (i.e. 0=no light detected, 1=light detected) will be "written" to memory by the controller 102 by adjusting the signal on line 106 to piezoelectric crystal 100 until the values detected by optical sensors OS3 and OS2 match. The output signal from controller 102 is maintained to store the value written to the memory cell.

A READ operation in the device of FIG. 14 is very similar to the WRITE operation, previously described. A READ signal incoming on line R is handled by system elements, analogous to the WRITE signal. Beamsplitters S50 and S52 perform the same function for the READ signal as do the beamsplitters S54 and S56, respectively, for the WRITE signal. Similarly mirrors M30 and M32 perform analogous functions to mirrors M38 and M36, respectively. The incoming READ signal is detected by optical sensor OS6, which is connected to controller 102 by lines LN6 and 104. As discussed with reference to the WRITE operation, in a READ operation, the CLOCK signal, having been split and reflected, recombines destructively so that only the READ signal impinges on beamsplitter S60.

The relationship of the READ and WRITE signals will depend on the particular application in which the apparatus of FIG. 14 is used. The READ and WRITE signals may be generated independently of each other or may be controlled so that when input to beamsplitters S50 and S54, respectively, they interfere constructively or destructively. They may also be controlled to be out of phase by a specified value which would be empirically determined as a function of the specific application.

In the preferred embodiment, it is assumed that the READ and WRITE signals will combine out of phase to the extent that when the superposition of the READ and WRITE signals is combined with an incoming DATA signal, the READ and WRITE signals interfere destructively. Even in a READ operation, a DATA signal may be input on line D and detected by optical sensor OS3. This capability supports an "if data found" logic operation, an operation in which the signal on the data line is filtered by the memory state. The result is output directly for this state (14 in state table) at RO. A passive form of an "if data found" logic operation is also supported (see state 13 in state table). Passive refers to the condition in which no READ command is present, but data is filtered by the unchanged memory state as determined by the position of M44. Again utilization of the apparatus of FIG. 14 will depend on the specific application. In the "if data found" application, the READ signal must interfere constructively with the DATA signal. When the READ and DATA signals interfere constructively at the interface of beamsplitter S60, the resulting signal is reflected and transmitted by beamsplitter S62. The transmitted portion is incident on beamsplitter S64, and the reflected portion is detected by optical sensor OS4.

During the READ operation, the resultant output signal, available on line RO and detected by sensor OS2, is a function of the position of mirrored surface M44. If the mirrored surface M44 is positioned for constructive interference at the optical combining interface of beamsplitter S64 (i.e. by a previous write operation that wrote a "1" to memory), then the READ signal becomes the output (on line RO) of memory. The read access time is limited only by the optical clock rate. If the mirrored surface M44 is positioned for destructive interference at the optical combining interface of beamsplitter S64 (i.e. by a previous write operation that wrote a "0" to memory), then a null (0) signal is present on line RO and detected by optical sensor OS2, independent of the READ signal. In this instance the READ operation will yield a null, or binary 0, result. With reference to the state table of FIG. 14, the results of read operations are indicated by states 6 or 14.

The apparatus of FIG. 14 can be used in a wide variety of applications. For example, referring to the state table of FIG. 14, state 13 is a special case where data is present but neither a READ or WRITE signal is present. In this instance, the memory cell can be used as a logical "go/no go" data pass-through filter. The memory acts as a passive "if data present" logical element where data is passed through only if the memory has a "1" stored when the data signal is incident on beamsplitter S58.

Various modifications and variations will occur to those skilled in the art to which this invention pertains. For example, the interferometry architecture described herein may be modified according to the individual needs of the system being designed. The system could be constructed using various numbers of beamsplitters and mirrored surfaces based upon the general principles as set forth herein. To illustrate, rather than having two sets of four beamsplitters attached to the central solid web (FIGS. 4 through 8), and the pair of mirrored surfaces associated with each beamsplitter in one of the sets containing four beamsplitters, there could be many more sets in the arrangement, and each set could comprise more or less than the four beamsplitters presented herein in the preferred embodiment.

Self-switching Optical Digital Clock

There may be certain limitations for implementing an optical digital clock using piezoelectric crystals to generate a synthesized digital signal. In particular, the effective operating range for digital signal frequencies above 100 GHz may be limited. This device has an advantage however, as previously discussed, in its capability to generate more complex digital signals and analog waveforms within its effective operating range.

A less sophisticated device may be adequate in many applications. The self-switching optical digital clock embodiment of the present invention would satisfy the requirements of such applications. This device generates a digital signal using analog optical feedback signals of precise time durations. The time durations are created by precise, passive time delay feedback circuits and interferometry.

Figure 15:
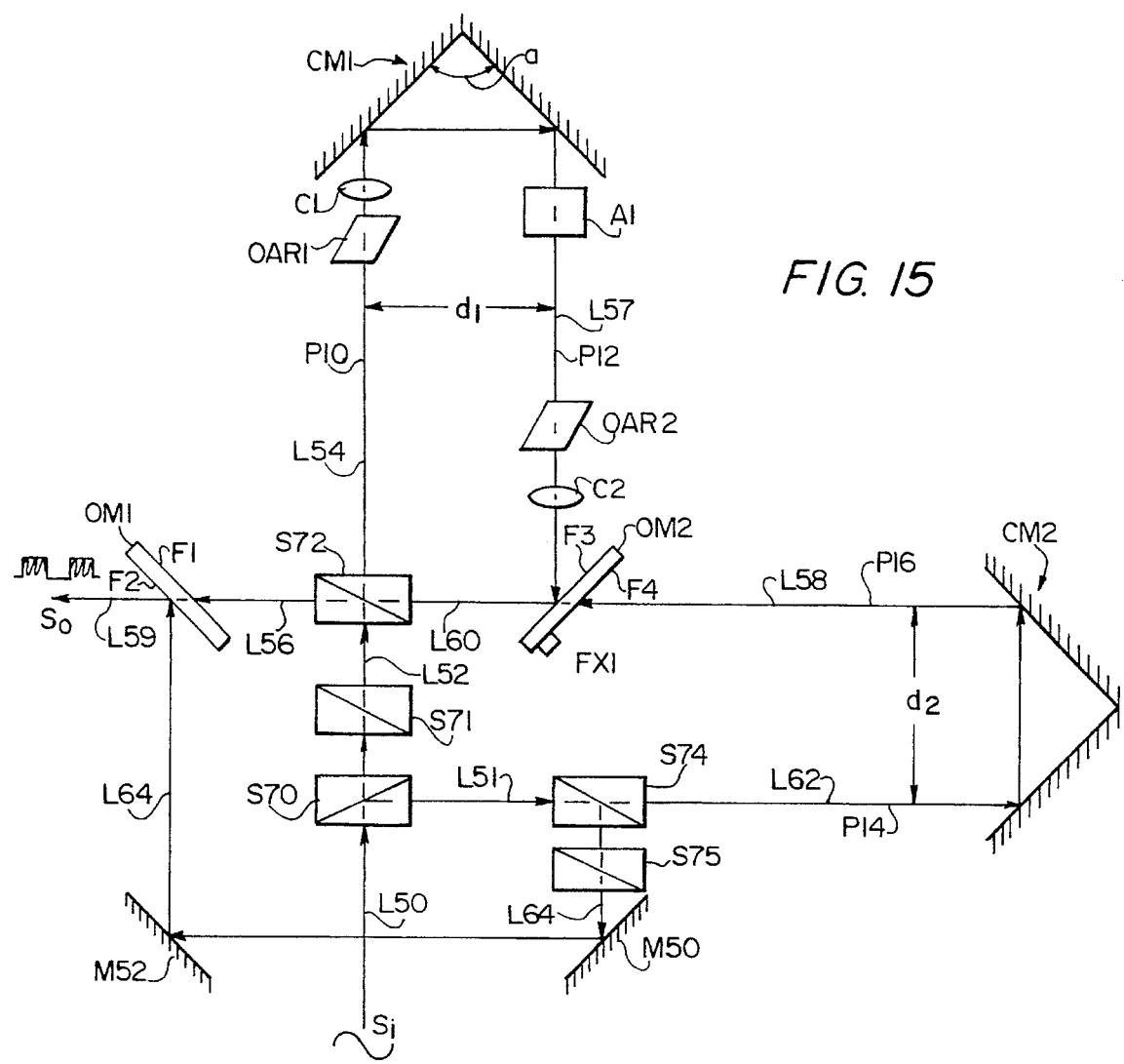
FIG. 15 is an illustration of a first embodiment of the self-switching optical digital clock of the present invention.

Discussion of the self-switching digital optical clock will be presented in three main parts. The first part will deal with the interactions of the light paths along leg one of the optical digital clock. Referring to FIG. 15, leg one is defined (arbitrarily) to be the physical distance from the center of beamsplitter S72 to the compound mirror CM1. Part 2 of the discussion will focus on leg two of the digital optical clock.

Leg two is defined to be the distance from the center of beamsplitter S74 to the compound mirror CM2. The final part will present the optical interaction and required phase relationships at one-way mirror OM1 which yield the digital output signal S0.

Referring to FIG. 15, input light beam L50 from source Si is incident on the input face of beamsplitter S70. Light source Si produces a monochromatic beam of light, such as from a laser, at an optical frequency Fi to the digital optical clock. Input light beam L50 is reflected and transmitted and is thereby split into two portions L52 and L51. Portion L52 is the transmitted beam and portion L51 is the reflected beam. Note that beamsplitter S71, placed in the path of light beam L52, functions to halve the amplitude of the transmitted beam from beamsplitter S70. Half of the output of S71 is discarded. Either the transmitted or the reflected portion may be selected as input to S72. The embodiment shown in FIG. 15 uses the transmitted portion. Light beam L52 is incident on a second beamsplitter S72 where it is split into two beam portions L54 and L56. Light beam L54 is transmitted by beamsplitter S72 and light beam L56 is reflected by beamsplitter S72. Light beam L56 is incident on the transmitting face F1 of a one-way output mirror OM1. The interaction of L56 and L64 resulting in the light beam L59, at the one-way mirror OM1 will be discussed hereinafter in relation to the final output stage of the digital clock.

Figure 18:
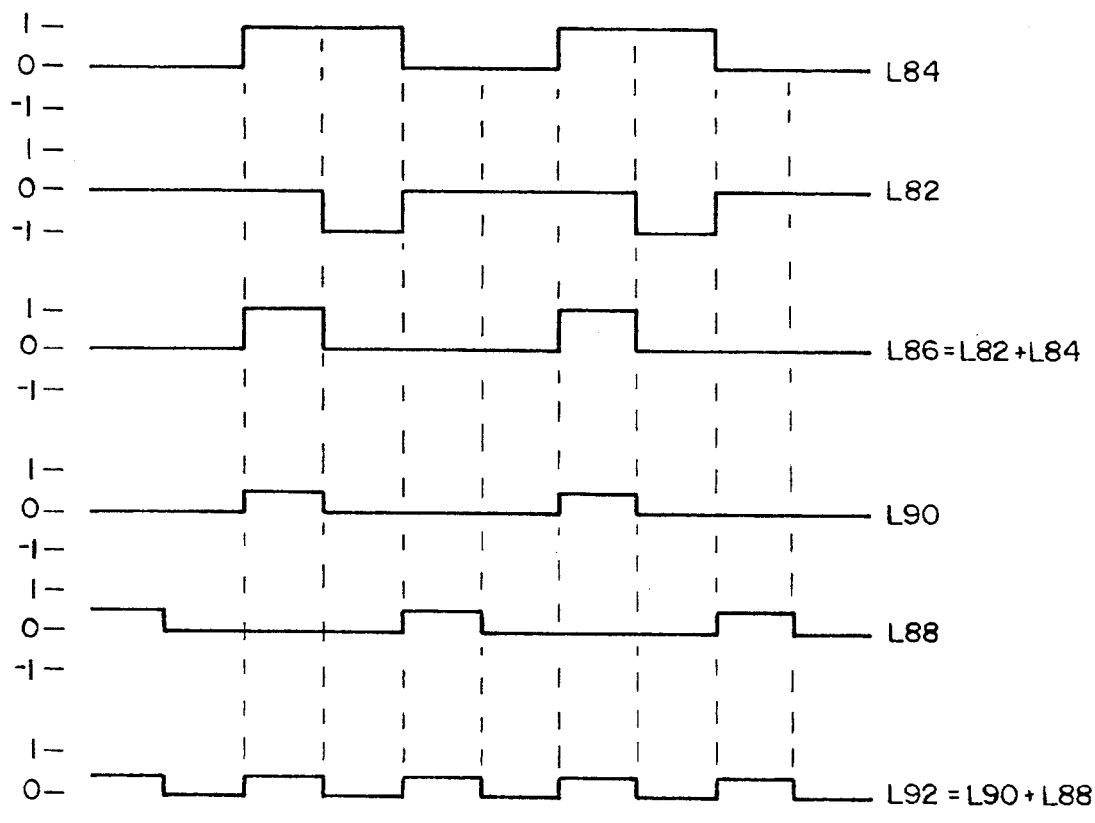
FIG. 18 is an illustration of the form of the signals in the phase modulated two-stage output of the clock embodiment of FIG. 17.

Light beam L54 is transmitted by beamsplitter S72 and is incident on compound mirror CM1. In a preferred embodiment, CM1 is arranged as two flat orthogonal planes. However, the internal angle "a" will be selected empirically to cause the light beam L54 to be reflected back on a path P12 parallel to the exit path P10 of light beam L54 from beamsplitter S72 a distance $d_1$ away from such exit path. Other devices can be selected to achieve the purpose of CM1; for example, a parabolic mirror of correct excentricity or a concave spherical reflector of the correct radius. Reflected light beam L57 is incident on the reflecting surface F3 of one-way mirror OM2. The light signal L57 is amplified by optical signal amplifier A1 to approximately twice its exit amplitude from beamsplitter S72. Details of the optical signal amplifier are included hereinafter with reference to the embodiment of FIG. 18. It will be apparent to those familiar with the art that an infinite number of combinations of amplitude reductions/amplifications may be selected to yield these results. The amplitude reduction selected will determine the amplification required and conversely the amplification available will determine the amount of amplitude reduction required. The specific embodiment set forth in this specification does not imply a limitation on these values. The signals L52 upon entering beamsplitter S72 and L51 upon entering beamsplitter S74 are in phase but the relative amplitudes of L51 to L52 are proportionally 2:1. This amplitude ratio is an approximation and must be adjusted slightly to accommodate losses due to variations in reflectivity and transmissivity throughout the system. The relative amplitudes may be adjusted when the system is initially set up by using various filters, or they may be adjusted dynamically by using optical interference regulators OAR1 and OAR2. Optical interference regulators OAR1 and OAR2 will be discussed in greater detail hereinafter.

The fixture FX1 for OM2 is adjustable to allow OM2 to be repositioned for both alignment of light beam L58 with light beam L57 and for phase adjustment of resultant light beam L60, which is the combination of light signals L57 and L58. The combined light beam L60 (reflected component, L57, and transmitted component, L58) is reflected by one-way mirror OM2, and is incident on beamsplitter S72. Light beam L60 combines with light beam L52 at the beamsplitting interface of S72 with a phase difference of approximately 180 degrees. The resulting interference causes the phase of light signals L54 and L56 to shift by 180 degrees. Under ideal conditions, such phase shift of 180 degrees, due to interference with light beam L60, will be smooth and sudden. Light beam L60 is the resultant signal of the combination of L57 and L58. Light beams L57 and L58 combine in phase arriving at the same instant at the optical interface of OM2. Let the optical path length of Leg1=OPL1 and let the optical path length of Leg2=OPL2. Ideally, OPL1=OPL2+nλ where n=−1,0,1. Integer values of |n|>1 may introduce additional signal distortion; however, integer values of n should still provide sufficient signal strength by constructive interference to generate the primary clock pulse at L56. Unbalanced optical path lengths OPL1 and OPL2, that is, non-integer values of n will lead to initial duty cycles of less than 50% as well as potentially less ON—OFF contrast due to distortion caused by interfering wavefronts with wavefronts of different time functions. It is anticipated that such temporal distortion will be measurable, but not damaging to the clock signal.

Referring back now to beamsplitter S70, input light beam L50 is split by beamsplitter S70 into transmitted portion L52 and reflected portion L51 as previously discussed. Reflected portion L51 is incident on the face of beamsplitter S74 and split into two light beams L62 and L64. The amplitude of L51 is twice that of L52. Note that beamsplitter S75, placed in the path of light beam L64, functions to halve the amplitude of the reflected beam from beamsplitter S74. As discussed earlier, in the case of S71, half of the light from beamsplitter S75 may be discarded. Light beam L64 is incident on mirrors M50 and M52, and ultimately is incident on the reflecting face F2 of one-way mirror OM1, the function of which will be discussed hereinafter.

Light beam L62 is transmitted by beamsplitter S74 and is incident on compound mirror CM2. CM2 is arranged as CM1, with two flat planes mounted at approximately 90 degrees to each other. Again, a parabolic mirror of correct excentricity or a concave spherical reflector of the correct radius are two examples of other configurations which could also be used for this purpose. A compound planar mirror is chosen to minimize both the number of reflections and non-linear distortion of the reflected signal. The return path P16 is parallel to path P14 and separated a distance $d_2$. The reflected light beam L58 is incident on the transmitting face F4 of one-way mirror OM2, combining with the reflected light beam L57 at the optical surface of OM2. Light beams L57 and L58 are combined in phase by constructive interference to yield a light beam with an amplitude approximately the sum of the amplitudes of L57 and L58. When the amplitude of L57 equals the amplitude of L58, then the resulting amplitude of L60 is approximately double that of either L57 or L58 alone. This resultant light beam L60 is now of sufficient amplitude to invert the phase of light beam L52 completely, under ideal conditions. Light beam L64 is a constant balancing or biasing carrier signal which when combined with light beam L56 produces total cancellation at one phase of light beam L56 and complete constructive interference at the alternate phase of L56. The phase of L56 can be expressed as: $PL56=A(\sin(2\pi\gamma+\phi)+\cos(2\pi\gamma+\phi))$. The alternate phase of L56 can be expressed as $PL56'=A(\sin(2\pi\gamma+\phi+180)+\cos(2\pi\gamma+\phi+180))$ where γ is the frequency of the source and φ is a constant phase angle of arbitrary value. The phase of L56 alternates between PL56 and PL56' once each time the light signal traverses each leg of the digital clock of FIG. 15. Biasing signal L64 is of constant phase and is adjusted to combine destructively with L56 when it is PL56 and constructively with L56 when it is PL56'. This signal may also be adjusted such that L64 combines constructively with L56 when it is PL56 and destructively with L56 when it is PL56'. This change will cause a phase shift of π in both the carrier signal and the digital pulse.

The following table shows an example of the amplitude A of each signal for each subsequent traversal by the light signal of each leg of the clock. The negative sign (−) indicates a phase difference of 180 degrees.

| L52 | L51 | L54 | L56 | L57 | L64 | L58 | L60 | L59 |
|-----|-----|-----|-----|-----|-----|-----|-----|-----|
| A | 2A | A/2 | A/2 | A | −A/2 | A | −2A | 0 |
| A | 2A | −A/2 | −A/2 | −A | −A/2 | A | 0 | −A |
| A | 2A | A/2 | A/2 | A | −A/2 | A | −2A | 0 |
| A | 2A | −A/2 | −A/2 | −A | −A/2 | A | 0 | −A |
| A | 2A | A/2 | A/2 | A | −A/2 | A | −2A | 0 |
| A | 2A | −A/2 | −A/2 | −A | −A/2 | A | 0 | −A |
| A | 2A | A/2 | A/2 | A | −A/2 | A | −2A | 0 |
| . | . | . | . | . | . | . | . | . |
| . | . | . | . | . | . | . | . | . |
| . | . | . | . | . | . | . | . | . |

The lengths of the optical path of light beams L54 plus L57 and of the optical path of light beams L62 plus L58 will determine the fundamental digital frequency of the digital optical clock signal S0. The fundamental frequency of the clock is equal to the reciprocal of the time T required for the leading edge of either light beam L54 or L62 to leave its respective beamsplitter S72 or S74 and return to interfere at beamsplitter S72. This assumes that the optical path length difference between leg 1 and leg 2 of the optical digital clock is zero. Each new row in the above table further assumes one cycle from S72 to S72 has been completed.

A non-zero path length difference between leg 1 and leg 2 of this device will result in a transient third brightness state between each digital level, analogous to the slew in conventional digital clock signals. This is a transient effect that is seen each time the clock is initialized. This effect should be negligible after 100 clock cycles.

Figure 16:
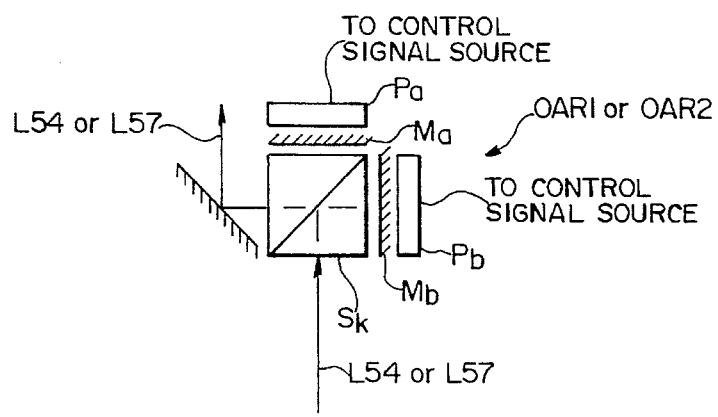
FIG. 16 is an illustration of an optical amplitude regulator of the present invention.

The in-line optical amplitude regulators OAR1 and OAR2 (FIG. 15) are Michelson Interferometers arranged to produce the equivalent of an optical resistance in the circuit. That is, an interferometer employed in this fashion in a photonics circuit is analogous to a variable resistor in an electrical circuit. FIG. 16 shows an exemplary optical amplitude regulator. By controlling the position of mirrors Ma and Mb using piezoelectric crystals Pa and Pb (connected to suitable control signal sources, not shown) the optical impedance can be adjusted from zero to infinite. The result is an infinite range optical potentiometer for photonics applications.

The in-line optical amplitude regulator has the additional benefit of final phase regulation for all optical impedance values. This is achieved by adjusting the position of Ma relative tomb to achieve the required amplitude, and then by moving both mirrors Ma and Mb an equal distance away from beamsplitter Sx to retard the phase or by moving the mirrors Ma and Mb an equal distance toward beamsplitter Sx to advance the phase. The in-line optical amplitude regulator can be used as an output phase matching regulator as well as a signal amplitude regulator. Both of these functions may be achieved either through manual observation and control, or through a feedback circuit to a controller designed or programmed for this purpose.

At any point or optical interface in this device fringes result from the subtle variations in path length across the optical signal, i.e. path length variations resulting from the finite transverse dimension of the optical signal. This dimension is large when compared with the wavelength of the optical signal resulting in the appearance of fringes. The fringes are removed through the use of a spatial filter mask of constant pitch. This mask is designed to pass an image of a given spatial frequency which allows only the bright fringes of the expected spatial frequency to pass. The image which is passed by the mask is focussed and recolumnated using standard laser optics. $C_1$ and $C_2$ (FIG. 15) are examples of the mask and recolumnating optics.

Figure 17:
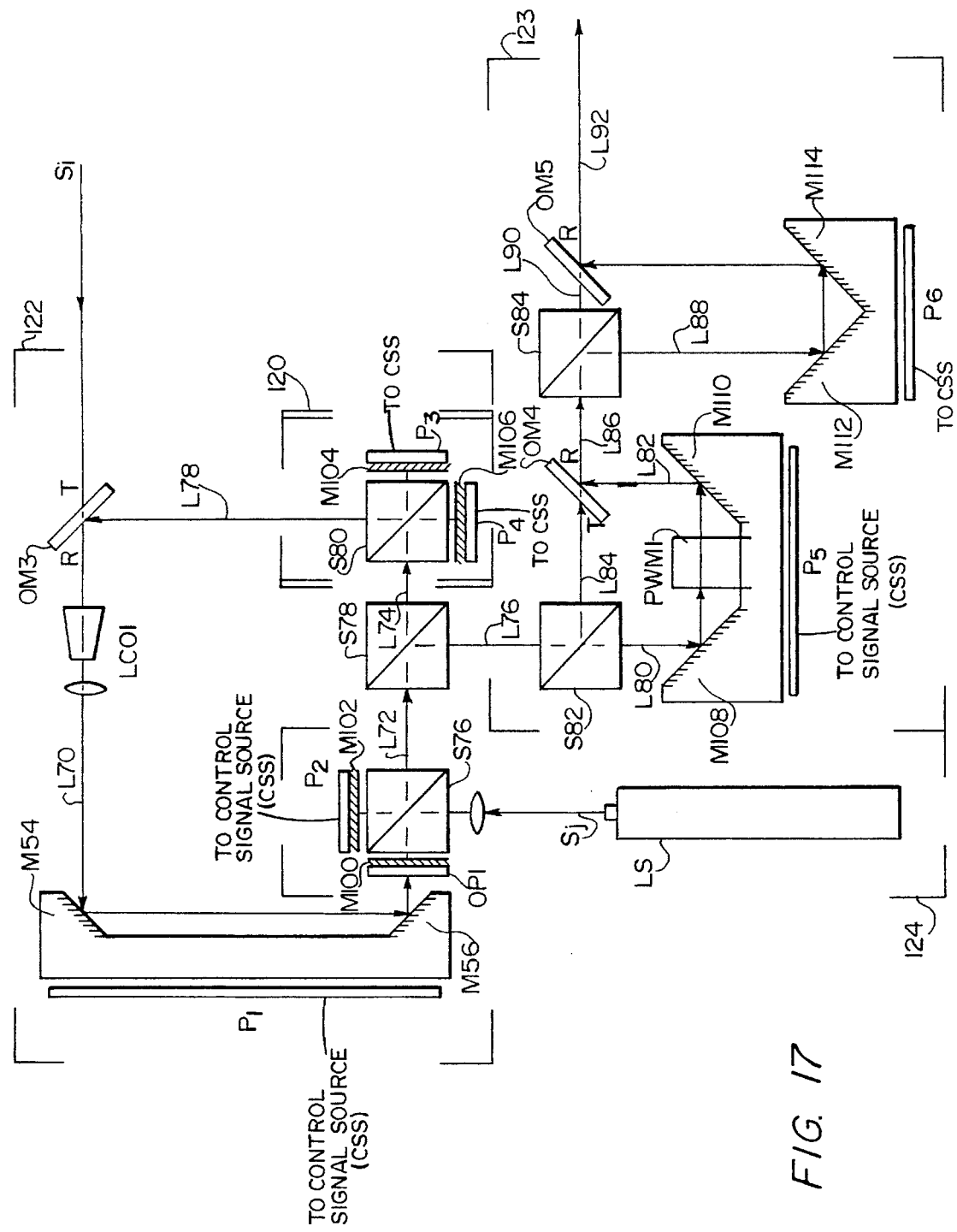
FIG. 17 is an illustration of a second embodiment of the self-switching optical digital clock of the present invention.

An alternate embodiment of the self-switching optical digital clock of the present invention is shown in FIG. 17. The fundamental processes used in the embodiment of FIG. 15 and the embodiment of FIG. 17 are the same, i.e. the physics of interferometry are used to produce the digital (square-wave) signal. An amplifier, which was disclosed only generally as A1 in the embodiment of FIG. 15, is utilized and disclosed in greater detail in the embodiment of FIG. 17.

Referring now to FIG. 17, the Self-Switching Optical Digital Clock is composed of four basic building blocks, the phase modulated Self-Switching Digital Clock circuit, (designated in brackets as 122), the Optical Switching Amplifier circuit, (designated in brackets as 124), Pulse Width Modulator-Digital Frequency Doubler circuit (designated in brackets as 123) and the Phase Modulated Optical Amplitude Regulator (designated in brackets as 120).

Input signals Si and Sj are constant coherent light sources of the same fundamental optical carrier frequency. This is required because these signals must be able to interfere destructively to create the desired output signal. Sj may be generated by a second laser LS, or by an alternative means, by dividing off a portion of Si using a beamsplitter not shown in FIG. 17. If Sj is divided off Si then Si would have to be attenuated again by approximately a factor of 2 to arrive at the appropriate amplitude prior to recombination. This approach requires the necessary optical elements to route the light divided off Si to the input location for Sj. This alternative approach is included to provide a design with a single light source.

Referring again to FIG. 17, the input signal Si is transmitted by one-way mirror OM3, and condensed by the laser condensing optics LCO1. The condensed signal is L70. Signal L70 is reflected by mirrors M54 and M56 which are arranged on a solid structure orthogonal to each other if the planes of the mirrors were extended to intersection. The structure on which mirrors M54 and M56 are mounted is attached to a piezoelectric crystal P1 which controls the positions of mirrors M54 and M56. The range of optical path lengths created by moving M54 and M56 together determines range of the digital pulse duration available to the clock.

L70 is incident on the surface of OP1, an optically sensitive piezoelectric crystal. OP1 is a piezoelectric crystal which is also doped with, or attached to a fast photo-voltaic material designed to generate a voltage drop across the piezoelectric crystal. This voltage moves attached mirror M100 a distance commensurate with the intensity of signal L70.

Optical Switching Amplifier (OSA) 124 is composed of a laser light source LS, and a photo sensitive optical amplitude regulator. In this application the optical amplitude regulator is operating as a switching transistor. When the optical signal L70 is present or maximum intensity, mirror M100 is positioned to cause L72 to be a maximum output. When the optical signal L70 goes to zero, mirror M100 is positioned to cause Sj to interfere destructively with itself at beamsplitter S76 and the output L72 is zero. Piezoelectric crystal P2 controls the position of mirror M102 to calibrate this signal. The calibration signal is provided by a conventional controller, not shown in FIG. 17.

OSA 124 is tuned empirically such that when signal L70 is a maximum, mirror M100 is in the position to cause Sj to interfere constructively with itself generating a signal that is greater than two times the signal Si. Input signal Sj is a constant, coherent light source with greater than twice the amplitude of Si. Signal Sj is independent of L70. L72 is a maximum when L70 is a maximum. The degree of movement of mirror M100 will be a function of the amplitude of signal L70. This means that the degree of constructive or destructive interference, and therefore the amplitude of signal L72, will be proportional to the amplitude of signal L70 when the distance 'd' of mirror M100 movement is $\phi \leq d \leq \pm l/\pm \lambda/2 l$. L72 is incident on beamsplitter S78. L72 is split into two parts by beamsplitter S78, a transmitted part L74 and a reflected part L76. Signal L74 is incident on beamsplitter S80 and is subsequently split into a transmitted and a reflected portion. The positions of mirrors M104 and M106 are controlled by piezoelectric crystals P3 and P4. The mirrors M104 and M106 are positioned to cause the output signal L78 to cancel the input signal Si through destructive interference, i.e. L78 will be the same amplitude as Si but 180° out of phase.

When the last wavelength of light signal L70 is incident on OP1, the mirror M100 begins to be repositioned to cause the signal Sj to interfere destructively with itself. When signal L72 goes to zero, this absence of light is propagated to L78. When L78 goes to zero, there is no longer any interference with input signal Si, and signal L70 returns to maximum amplitude. This cycle is perpetual as long as the signals Si and Sj remain constant.

Signal L76 is the output signal. L76 is incident on beamsplitter S82 and is subsequently split into a transmitted portion and a reflected portion. The transmitted portion, L80, is incident on and reflected by mirror M108. Signal L80 is incident on a pulse width modulator circuit, PWM1. This circuit changes the duty cycle of the digital signal L80 (duty cycle=50%) to a 25% duty cycle signal L82, seen in FIG. 18. Signal L82 is then reflected by mirror M110 to one-way mirror OM4. The reflected portion of L76, L84 is incident on and transmitted by one-way mirror OM4. Signal L82 is reflected by one-way mirror OM4 and signals L84 and L82 are combined at the interface of one-way mirror OM4 to produce L86, see FIG. 18. The structure on which mirrors M108 and M110 are mounted can be moved to change the optical path length traversed by signal L82. The adjustment creates the necessary time delay between L84 and L82 of approximately λ/4 of the digital pulse to create the signal L86.

Signal L86 is incident on beamsplitter S84 and subsequently split into a reflected portion, L88 and a transmitted portion, L90. Signals L88 and L90 are half the amplitude of signal L86. Signal L88 is delayed in time λ/2 of the digital signal L86. A similar arrangement of planar mirrors (M112 and M114) is used to reflect signal L88 back to one-way mirror OM5 where L90 and L88 are recombined to create signal L92, see FIG. 18. Signal L92 is the final output signal of the self-switching optical digital clock. Note that in FIG. 18, the amplitudes of signals L90, L88 and L92 are approximately half the amplitude of signal L84.

The advent of an optical digital clock of the present invention, either active or self-switching suggests the need for an optical processor. Conventional digital processors are an integration of logic gates and transistors designed to combine fundamental input signals in a systematic manner to achieve high speed computational or boolean (logical) results. A programmable optical logic gate will be an integral part of such an optical processor. The advantages of a programmable optical logic gate are its speed, flexibility, and near zero sensitivity to noise. The programmable logic gate possesses six independently programmable and addressable logic functions. These logic functions are AND, OR, XOR (exclusive OR), NAND (negated AND), NOR, and XNOR. The programmable optical logic gate also provides the option of negating a single input, or both inputs to any of the above logic functions, that is to perform the function of a logical inverter in series with either or both inputs.

Figure 19:
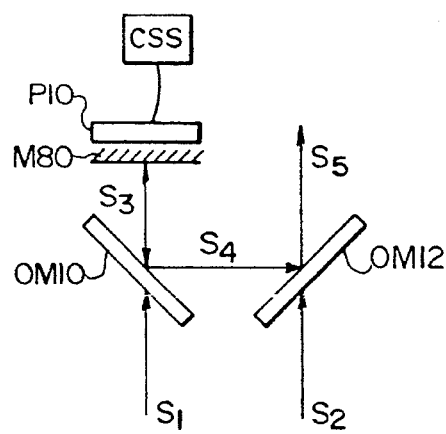
FIG. 19 is an illustration of a logic gate embodiment of the present invention functioning as a programmable OR/XOR.

Referring now to FIG. 19, there is illustrated a programmable OR/XOR Gate. Two coherent optical signals labelled $S_1$ and $S_2$ are shown as inputs to the programmable OR/XOR gate. Assume that these two inputs are in phase when they arrive at the respective optical interfaces of one way mirror OM10 and one way mirror OM12. $S_1$ is transmitted by one way mirror OM10 and reflected by mirror M80. The position of mirror M80 is controlled by piezoelectric crystal P10. $S_3$ is reflected from mirror M80 and is incident on the reflecting side of one way mirror OM10. $S_4$ is reflected by one way mirror OM10. $S_4$ is incident on the reflecting surface or reflecting side of one way mirror OM12 and combined at this optical interface with $S_2$ which is transmitted by one way mirror OM12. The two signals combine with a phase difference of 90 degrees (OR-function) or with a phase difference of 180 degrees (XOR-function) resulting in signal $S_5$. This phase difference is introduced by mirror MS0, the movement of which is controlled by piezoelectric crystal P10, which will be connected to a suitable control signal source (CSS). Other mechanical or electro-mechanical devices may be employed to move mirror (i.e. reflecting surface) M80 to introduce the desired phase difference, which must be achieved through empirical testing for a given environment. If $S_4$ and $S_2$ combine at 90 degrees phase difference, the amplitude of output signal $S_5$ is the average of the input amplitudes. Assume that the amplitudes of $S_1$ and $S_2$ are equal. This results in the logical OR function as tabulated below.

| $S_1$ | $S_2$ | $S_5$ |
|---|---|---|
| 0 | 0 | 0 |
| 1 | 0 | 1 |
| 0 | 1 | 1 |
| 1 | 1 | 1 |

If $S_4$ and $S_2$ combine at 180 degrees out of phase the following result is given.

| $S_1$ | $S_2$ | $S_5$ |
|---|---|---|
| 0 | 0 | 0 |
| 1 | 0 | 1 |
| 0 | 1 | 1 |
| 1 | 1 | 0 |

This is the XOR logic function. Thus, the logic gate can be programmed or controlled to perform either the OR function or the XOR function by controlling the phase difference introduced by reflecting surface or mirror M80.

In a general sense, the interferometric circuit of FIG. 19 is a bistable or bistate device functioning like the optical memory cell described previously herein. With reference to FIG. 19, signal $S_2$ is the reference signal of the bistable device. Signal $S_1$ will function as the comparator or detector signal. For example, if the circuit of FIG. 19 is programmed (i.e. controlled by movement of MS0) for the XOR function, a "zero" amplitude comparator signal $S_1$ will "read" or detect (at output signal $S_5$) the true state of reference signal $S_2$. Conversely, a "one" amplitude comparator signal $S_1$ will change (reverse) the detected state of reference signal $S_2$.

Figure 20:
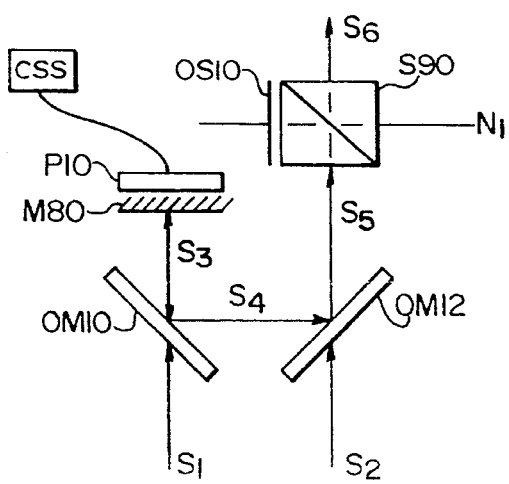
FIG. 20 is an illustration of a logic gate embodiment of the present invention functioning as a programmable NOR/XNOR.

Referring now to FIG. 20, to provide a negating signal (or NOT function) to create either the NOR logic function or the XNOR logic function a beamsplitter S90 and an independent, constant signal input $N_1$ are added to the assembly shown in FIG. 19. $N_1$ has the same amplitude and frequency as both of the inputs $S_1$ and $S_2$. $N_1$ is 180 degrees out of phase with $S_5$ at the optical interface of beamsplitter $B_1$. Optical sensor OS10 detects the presence or absence of function signal $S_5$. The interference of $S_5$ with $N_1$ creates the NOR signal as tabulated below.

| $S_1$ | $S_2$ | $S_5$ | $N_1$ | $S_6$ |
|---|---|---|---|---|
| 0 | 0 | 0 | 1 | 1 |
| 1 | 0 | 1 | 1 | 0 |
| 0 | 1 | 1 | 1 | 0 |
| 1 | 1 | 1 | 1 | 0 |

The same device programmed for the XOR function produces the XNOR function shown in the table below.

| $S_1$ | $S_2$ | $S_5$ | $N_1$ | $S_6$ |
|---|---|---|---|---|
| 0 | 0 | 0 | 1 | 1 |
| 1 | 0 | 1 | 1 | 0 |
| 0 | 1 | 1 | 1 | 0 |
| 1 | 1 | 0 | 1 | 1 |

These logic functions suggest that there is a simplified design which will satisfy the requirements of a programmable logic gate for all six basic logic functions: AND, OR, XOR, NAND, NOR, XNOR.

Although the system has been illustrated as a digital device, i.e., in providing a pulsed output, it could likewise be constructed using analog circuit principles in modulating, something short of an on/off condition, an optical signal without the confines of solid state materials as heretofore used in the art. Further, the electro-mechanical control for fine tuning of the reflected mirror surfaces could be a part of a microprocess or a computer-controlled feedback system to provide automatic fine tuning adjustment of the mirrored surface positions.

I claim:

1. An interferometric modulator for producing a square wave electromagnetic signal (So) through modulation of a sinusoidal electromagnetic carrier signal (Si) comprising;

means for providing a first sinusoidal electromagnetic carrier input signal (Si);

combining means (OM3), optically coupled to said input signal providing means (Si), for combining said input signal with a divided amplified delayed signal (L78) to produce a combined signal (L70);

delay means (M54,M56), optically coupled to said combining means (OM3), for delaying said combined signal (L70) to provide a delayed combined signal;

amplifying means (124), optically coupled to said delay means (M54,M56), for producing an amplified delayed signal (L72);

dividing means (S78), optically coupled to said amplifying means, for dividing said amplified delayed signal (L72) into an output signal (L76) representing said square wave electromagnetic signal (So), and into a divided amplified delayed signal (L78) having, during first periods T, an amplitude equal to said input signal (Si) but delayed 180 degrees out of phase with said input signal (Si), and during alternate periods T, a zero amplitude;

said dividing means (S78) being optically coupled to said combining means (OM3) whereby said divided amplified delayed signal (L78) combines by destructive interference with said input signal (Si) to produce, during said first periods T, a zero amplitude combined signal (L70), and during said alternate periods T, a combined signal (L70) having an amplitude equal to said input signal (Si).

2. An interferometric modulator as in claim 1 wherein said dividing means includes a first beamsplitter (S78) to provide an output signal representing said square wave electromagnetic signal.

3. An interferometric modulator as in claim 1 wherein said combining means for combining said input signal and said divided amplified delayed signal includes a first one-way mirror.

4. An interferometric modulator as in claim 1 wherein said amplifying means for producing an amplified delayed signal includes means (LS) for providing a second sinusoidal electromagnetic carrier input signal (Sj).

5. An interferometric modulator as in claim 4 wherein said means for providing a second sinusoidal electromagnetic carrier input signal is independent of said means for providing a first sinusoidal electromagnetic carrier input signal.

6. An interferometric modulator as in claim 4 wherein said means for providing a second sinusoidal electromagnetic carrier input signal includes means for dividing off a portion of said first sinusoidal electromagnetic carrier input signal.

7. An interferometric modulator as in claim 4 wherein said amplifying means for producing an amplified delayed signal includes an optically sensitive piezoelectric crystal.

8. An interferometric modulator as in claim 7 including a mirror attached to said crystal and wherein said crystal is responsive to said delayed combined signal for moving said mirror.

9. An interferometric modulator as in claim 8 wherein said amplifying means includes a second beamsplitter (S76) for receiving said second sinusoidal electromagnetic carrier input signal (Sj) and wherein movement of said mirror in response to a delayed combined signal of zero amplitude causes said second input signal (Sj) to combine destructively at said second beamsplitter (S76) to produce an amplified delayed signal (L72) of zero amplitude.

10. An interferometric modulator as in claim 8 wherein said amplifying means includes a second beamsplitter (S76) for receiving said second sinusoidal electromagnetic carrier input signal (Sj) and wherein said second input signal (Sj) has a greater amplitude than said first input signal (Si) and wherein movement of said mirror in response to a delayed combined signal of non-zero amplitude causes said second input signal (Sj) to combine with itself constructively at said second beamsplitter (S76) to produce an amplified delayed signal (L72) having an amplitude greater than said first input signal (Si).

11. An interferometric modulator as in claim 10 wherein said amplified delayed signal is approximately twice the amplitude of said first input signal.

12. An interferometric modulator as in claim 11 wherein said first beamsplitter (S78) of said dividing means divides said amplified delayed signal into an output signal representing said square wave electromagnetic signal (So) and a divided amplified delayed signal that is approximately the same amplitude as said first input signal (Si).

13. An interferometric modulator as in claim 12 including an amplitude regulating means (120) optically coupled to said first beamsplitter (S78) for regulating the amplitude of said divided amplified delayed signal.

14. An interferometric modulator as in claim 13 wherein said amplitude regulating means (120) includes a third beamsplitter (S80) for splitting said divided amplified delayed signal into a transmitted portion and a reflected portion and two mirrors (M104,M106) for reflecting back to said third beamsplitter said transmitted and reflected portions for recombination at said third beamsplitter.

15. An interferometric modulator as in claim 14 including means (P3,P4) for controlling the positions of said two mirrors for regulating a final amplitude of said divided amplified delayed signal.

16. An interferometric modulator as in claim 15 wherein said means for controlling includes at least one piezoelectric crystal.

17. An interferometric modulator as in claim 1 wherein said delay means for delaying said combined signal (L70) includes means (M54,M56) for reflecting said combined signal along a combined signal optical delay path.

18. An interferometric modulator as in claim 17 including means (P1) for moving said reflecting means to adjust the frequency of said square wave electromagnetic signal (So).

19. An interferometric modulator as in claim 18 wherein said moving means includes a piezoelectric crystal.

20. An interferometric modulator as in claim 19 wherein said reflecting means includes two mirrors mounted on a movable structure.

21. An interferometric modulator for producing a square wave electromagnetic signal (So) through modulation of a sinusoidal electromagnetic carrier signal (Si) comprising:
  means for providing a sinusoidal electromagnetic carrier input signal (Si);
  first dividing means (S70), optically coupled to said input signal providing means (Si), for dividing said input signal into first (L51) and second (L52) signal portions for travel along first and second independent light paths, respectively;
  said first light path including a first delay means (CM2), optically coupled to said first dividing means for delaying said first signal portion to produce a delayed first signal portion (L58);
  said second light path including a second dividing means (S72) for further dividing said second signal portion into a divided second signal portion (L54), and a second delay means (CM1), optically coupled to said second dividing means, for delaying said divided second signal portion, and an amplifying means (A1), optically coupled to said second delay means, for producing an amplified delayed divided second signal portion (L57);
  a third dividing means (S74), optically coupled to said first dividing means (S70), for dividing said first signal portion (L51) into a third signal portion (L64) for travel along a third independent light path;
  first means (OM2) for combining said delayed first signal portion (L58) and said amplified delayed divided second signal portion (L57) from said first and second light paths to interfere constructively for a time period T/2 and then alternately destructively for a time period T/2 to produce an alternating phase signal (L56);
  second means (OM1) for combining said alternating phase signal (L56) with said third signal portion (L64) from said third light path to produce said square wave electromagnetic signal (So) having a cycle time T.

22. An interferometric modulator as in claim 21 wherein said first delay means for delaying said first signal portion includes a compound mirror.

23. An interferometric modulator as in claim 22 wherein said second delay means for delaying said divided second signal portion includes a compound mirror.

24. An interferometric modulator as in claim 22 wherein said second delay means for delaying said divided second signal portion includes two mirrors.

25. An interferometric modulator as in claim 21 wherein said first dividing means includes at least one beamsplitter.

26. An interferometric modulator as in claim 21 wherein said first means for combining includes a one-way mirror.

27. An interferometric modulator for regulating the amplitude of a sinusoidal electromagnetic signal to a reduced value comprising:
  a beamsplitter for splitting said electromagnetic signal into a transmitted portion and a reflected portion;
  a first reflecting means for reflecting back to said beamsplitter said transmitted portion;
  a second reflecting means for reflecting back to said beamsplitter said reflected portion; and
  including means for moving said first reflecting means relative to said beamsplitter to introduce an optical impedance to produce a reduced amplitude regulated electromagnetic signal when said transmitted portion and reflected portion are recombined at said beamsplitter.

28. An interferometric modulator as in claim 27 wherein said means for moving includes a piezoelectric crystal.

29. An interferometric modulator as in claim 27 further including means for moving said second reflecting means relative to said beamsplitter.

30. An interferometric modulator as in claim 27 wherein said first and second reflecting means each include a mirror.

31. An interferometric modulator for amplifying an electromagnetic signal (Si) comprising:
  means for providing a first electromagnetic input signal (Si);
  an optically sensitive piezoelectric crystal (OP1) optically coupled to said input signal providing means (Si) and a mirror (M100) attached to said crystal, said crystal being responsive to said first input signal for moving said mirror in proportion to the amplitude of said first input signal (Si);

means for providing a second electromagnetic input signal (Sj) having an amplitude greater than said first input signal;

a beamsplitter (S76) for receiving said greater amplitude second input signal; and wherein said mirror is optically aligned with said beamsplitter such that when said first input signal has a zero amplitude said mirror is positioned to cause said second input signal to combine with itself destructively at said beamsplitter (S76) to produce a zero output, and when said first input signal has a non-zero amplitude, said mirror is moved to cause said second input signal to combine with itself constructively at said beamsplitter (S76) to produce an output signal having a greater amplitude than said first input signal.

32. An interferometric modulator as in claim 31 further comprising a second mirror optically aligned with said beamsplitter.

33. An interferometric modulator as in claim 32 further comprising a second piezoelectric attached to said second mirror to enable calibration of said output signal.

34. An interferometric modulator for amplifying an electromagnetic signal (Si) comprising:

means for providing a first electromagnetic input signal (Si);

an optically sensitive piezoelectric crystal (OP1) optically coupled to said input signal providing means (Si) and a mirror (M100) attached to said crystal, said crystal being responsive to said first input signal for moving said mirror in proportion to the amplitude of said first input signal (Si);

means for providing a second electromagnetic input signal (Sj) having an amplitude greater than said first input signal;

a beamsplitter (S76) for receiving said greater amplitude second input signal; and wherein said mirror is optically aligned with said beamsplitter such that when said first input signal has a zero amplitude said mirror is positioned to cause said second input signal to combine with itself constructively at said beamsplitter (S76) to produce a maximum magnitude output signal, and when said first input signal has a non-zero amplitude, said mirror is moved to cause said second input signal to combine with itself destructively at said beamsplitter (S76) to produce a proportionally lower amplitude output signal, and when said first input signal has a maximum amplitude, a zero output is produced.

35. An interferometric modulator for performing a logic function from one of the group including logical OR, AND, NAND, NOR, XNOR and XOR on an electromagnetic reference signal comprising:

means for receiving an electromagnetic reference signal;

means for receiving an electromagnetic comparator signal;

a control signal source for modulating said electromagnetic comparator signal to be out of phase with said reference signal in accordance with a selected logic function, said means for modulating including a reflecting means;

means for combining said modulated comparator signal with said reference signal to produce a logic function signal having one of two states.

36. An interferometric modulator as in claim 35 wherein said modulating means modulates said comparator signal to be out of phase by 90 degrees with said reference signal to produce a function signal that is a logical OR of said comparator signal and said reference signal.

37. An interferometric modulator as in claim 35 wherein said modulating means modulates said comparator signal to be out of phase by 180 degrees with said reference signal to produce a function signal that is a logical XOR of said comparator signal and said reference signal.

38. An interferometric modulator as in claim 35 wherein said reflecting means comprises a mirror.

39. An interferometric modulator as in claim 35 wherein said modulating means includes a piezoelectric crystal.

40. An interferometric modulator as in claim 35 wherein said means for receiving said comparator signal includes a one-way mirror.

41. An interferometric modulator as in claim 35 wherein said means for receiving said reference signal includes a first one-way mirror and said means for combining includes said first one-way mirror.

42. An interferometric modulator as in claim 36 further comprising a negating means for receiving said OR function signal and for producing a resultant function signal that is a logical NOR of said comparator signal and said reference signal.

43. An interferometric modulator as in claim 42 wherein said negating means includes a beamsplitting means for receiving and combining said OR function signal with a negating signal that is 180 degrees out of phase with said OR function signal.

44. An interferometric modulator as in claim 37 further comprising a negating means for receiving said XOR function signal and for producing a resultant function signal that is a logical XNOR of said comparator signal and said reference signal.

45. An interferometric modulator as in claim 44 wherein said negating means includes a beamsplitting means for receiving and combining said XOR function signal with a negating signal that is 180 degrees out of phase with said XOR function signal.

* * * * *